United States Patent
Hann et al.

(10) Patent No.: US 6,801,027 B2
(45) Date of Patent: Oct. 5, 2004

(54) POWER CONVERSION IN VARIABLE LOAD APPLICATIONS

(75) Inventors: Raymond E. Hann, Castaic, CA (US); James J. Polston, Palmdale, CA (US); Louis C. Josephs, Moorpark, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/254,800

(22) Filed: Sep. 26, 2002

(65) Prior Publication Data
US 2004/0062058 A1 Apr. 1, 2004

(51) Int. Cl.[7] .............................. G05F 1/40; H02M 7/04
(52) U.S. Cl. ........................................ 323/282; 363/89
(58) Field of Search .............................. 363/44, 78, 80, 363/81, 84, 89, 282, 351

(56) References Cited

U.S. PATENT DOCUMENTS

| | | | |
|---|---|---|---|
| 4,405,889 A | | 9/1983 | Overstreet et al. |
| 4,737,899 A | | 4/1988 | Lorec |
| 4,806,937 A | | 2/1989 | Peil |
| 4,827,391 A | | 5/1989 | Sills |
| 5,003,453 A | * | 3/1991 | Tighe et al. ................... 363/65 |
| 5,373,196 A | * | 12/1994 | Faley ........................... 307/46 |
| 5,406,470 A | * | 4/1995 | Ridley et al. ................. 363/69 |
| 6,137,280 A | * | 10/2000 | Ackermann et al. ........ 323/354 |
| 6,208,127 B1 | | 3/2001 | Doluca |
| 6,259,237 B1 | | 7/2001 | Fischer |
| 6,396,252 B1 | | 5/2002 | Culpepper et al. |
| RE37,738 E | | 6/2002 | Brkovic |
| 6,404,076 B1 | | 6/2002 | Matsuda et al. |

* cited by examiner

Primary Examiner—Adolf Berhane
(74) Attorney, Agent, or Firm—Hunton & Williams

(57) ABSTRACT

A power conversion unit and method for efficient conversion of power for one or more variable loads are disclosed herein. Power having a first form is supplied to one or more power conversion units (PCUs) connected to the one or more variable loads. The PCUs are adapted to convert the power from the first form to other forms suitable for use by the components of the destination system. Based at least in part on a predicted load requirement of the variable load, the operation of the PCUs can be controlled to provide sufficient power to the one or more loads at the appropriate time while minimizing wasted power generation by deactivating any unnecessary PCUs during a decrease in power consumption or by activating PCUs during an increase in power consumption. Additionally, based at least in part on a predicted temporary change in the load requirements, the PCU can change its output voltage in anticipation of the temporary change in the load requirement, such as by increasing the output voltage to provide additional energy to the one or more variable loads during a temporary increase in power consumption or by decreasing the output voltage during a temporary decrease in power consumption. The present invention proves particularly beneficial when employed to distribute power within a radar system.

45 Claims, 8 Drawing Sheets

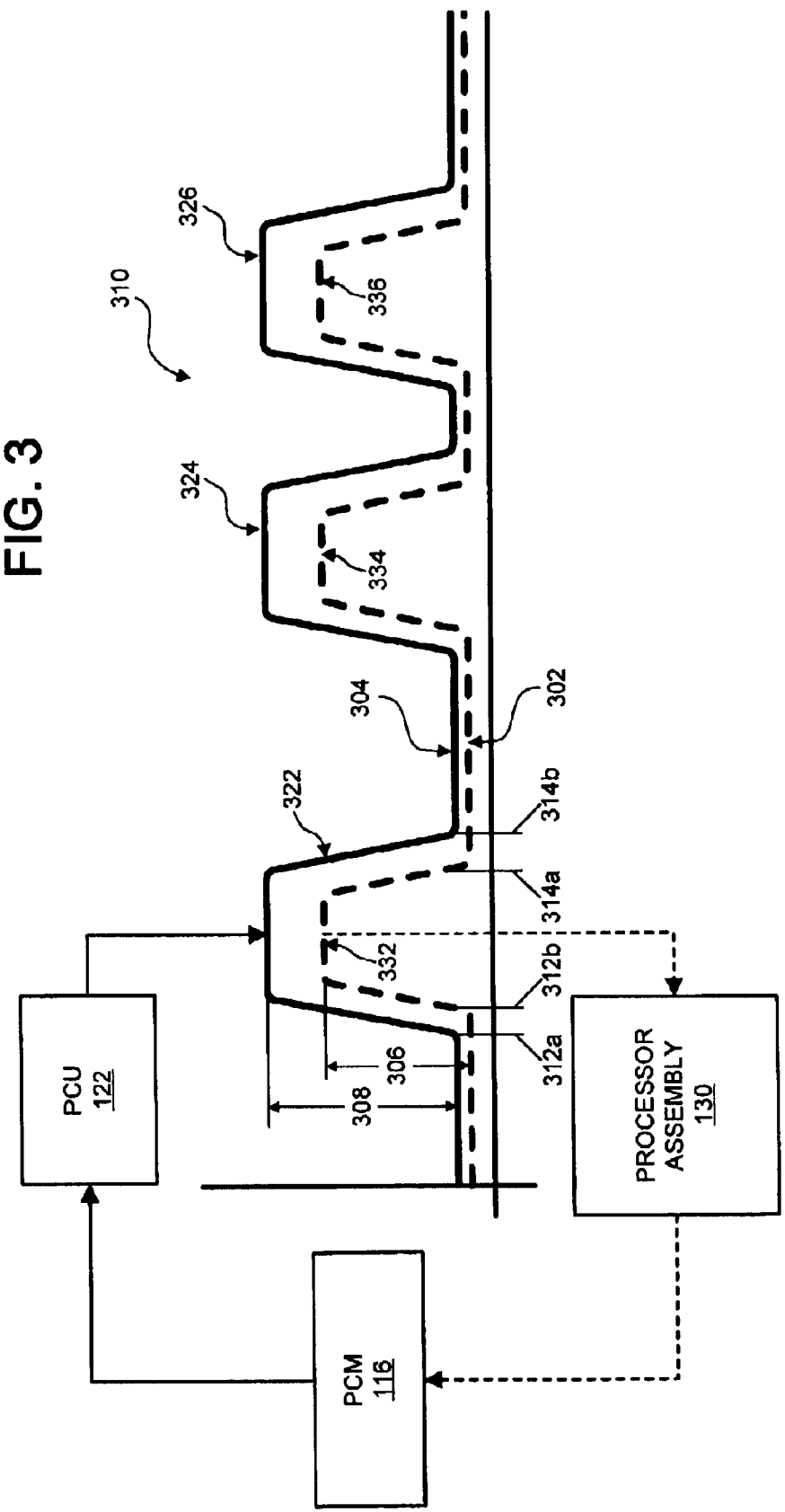

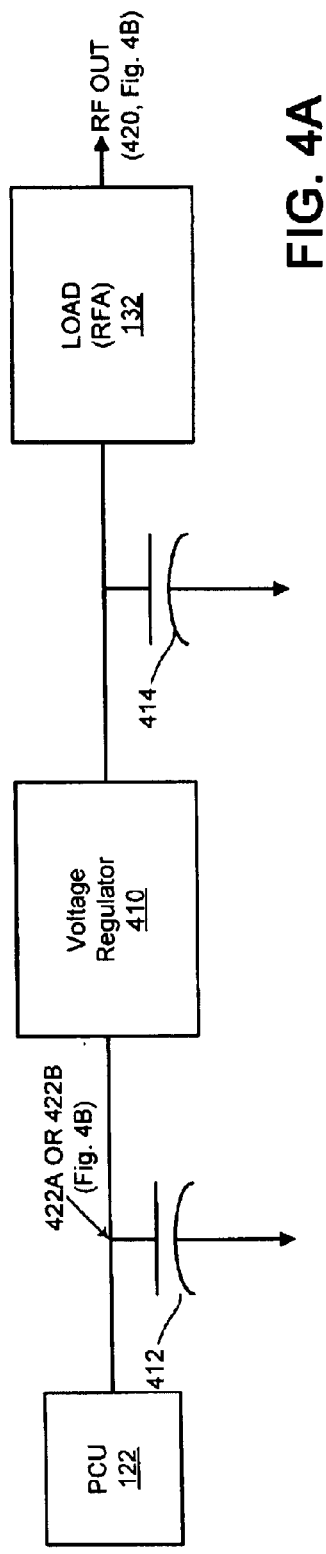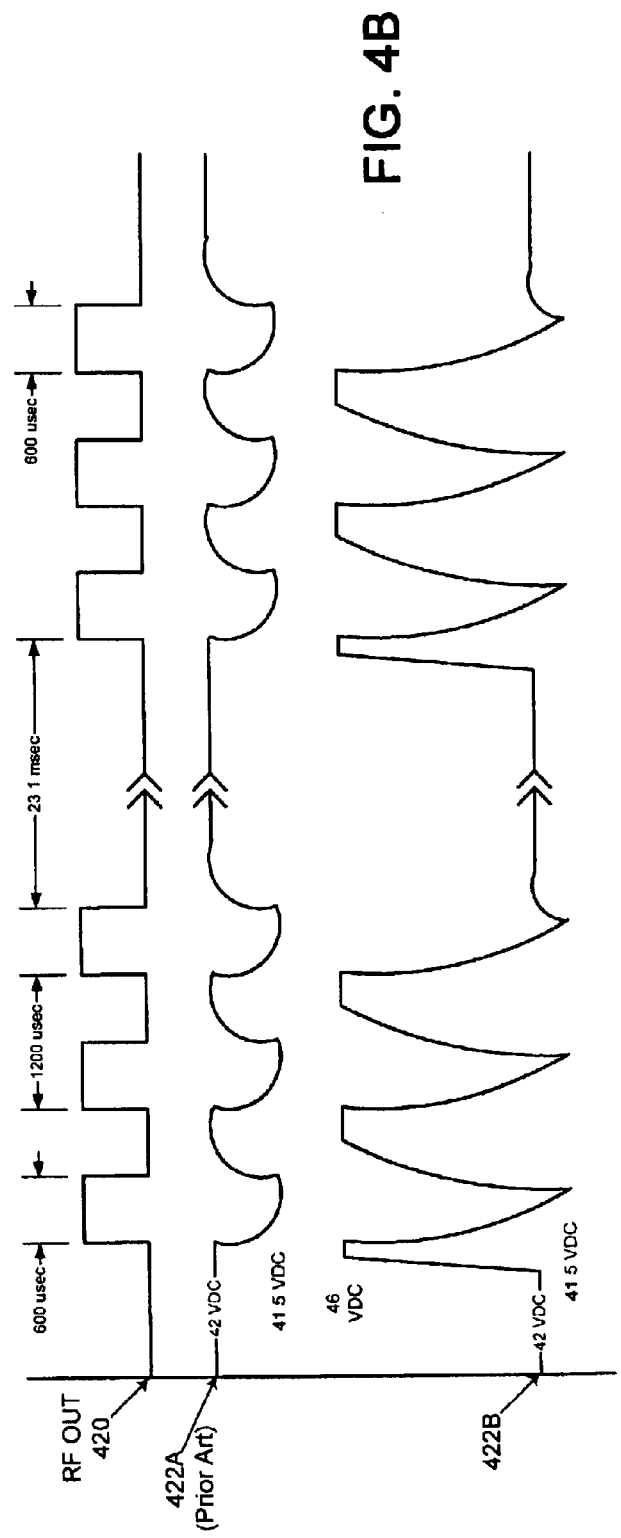

POWER CONVERSION IN VARIABLE LOAD APPLICATIONS

FIELD OF THE INVENTION

The present invention relates generally to power conversion systems and more specifically to power conversion in radar antenna systems.

BACKGROUND OF THE INVENTION

Proper management of power for a destination system, such as conditioning and distribution, often is critical to the operation of the destination system. However, many difficulties complicate the management of power in such systems. For one, many such destination systems include components having different requirements for the form of power supplied. Some components may require an alternating current (AC) electrical feed, others may require direct current (DC) power, and the voltage, current, and/or frequency requirements may differ for different components of the destination system. Another complication often present is that such destination systems often have variable load requirements, making it difficult for conventional power management and distribution systems to provide an adequate amount of power.

Power management is particularly critical in radar antenna systems, where additional difficulties and constraints often are introduced. For example, in addition to different power form requirements, many radar antenna systems, such as Active Aperture Array radar systems, have temporary, rapid increases, or "pulses", in power consumption during periods of long pulse, high duty scan modes. As a result, the load requirement of the radar antenna varies both substantially and frequently. Likewise, because of the environment in which radar antenna systems typically operate, further consideration is made for the ease of mobility and the ability of the power distribution system to interface with a variety of power sources. Likewise, because of potential hostile actions by adversaries, these radar antenna systems often have certain requirements of the power distribution system with regards to defense, such as by requiring a minimized infrared signature.

Accordingly, various power management systems have been developed to address some or all of these difficulties. However, these known systems have a number of limitations. For one, these known systems typically include a single power source that provides all of the power for the system. Such an arrangement does not accommodate for a failure of the single power source and therefore does not provide redundancy. In response, some known power management/distribution systems include a second power source in parallel with a first power source. Although this arrangement provides redundancy, it too has inherent limitations. Either both power sources must be operational simultaneously, resulting in wasted power/fuel and/or increased operational costs, or only one power source is kept operational at a time, thereby minimizing waste but requiring some down time to switch between one power source to the other power source in the event of a failure or any necessary repairs/maintenance. As a result, degradation in the capability of the power distribution system to provide power generally causes degradation in the performance of the radar antenna system.

Another limitation of known power management systems arises in variable load applications. Conventional power management systems typically provide power at full capacity, thereby causing wasted power during periods of light duty by the destination system. For example, many radar antenna systems operate in a light duty mode a majority of the time and only operate at full capacity during periods of alert, such as when an unknown entity has been detected. Accordingly, to provide for these brief periods of high duty, known radar antenna power systems continuously provide power adequate for the full capacity operation of the radar antenna system, thereby wasting a significant amount of power during light duty periods.

Furthermore, many known power management systems employ power converters to convert power from a first form to power having a second form, such as from alternating current (AC) power to direct current (DC) power. These power converters typically receive power in the first form from one or more power sources, convert the power, and provide the converted power to a component of a system. To illustrate, many types of AC-DC converters include a universal front end where the AC mains typically range between 85 volts AC (VAC) and 265 VAC at between 50 and 60 hertz (Hz). These types of AC-DC converters typically rectify and capacitively filter the AC input to provide a low ripple DC buss to a DC-DC converter.

However, these known converter have a number of limitations. For one, these known converters typically have severe line current harmonics and therefore generally do not comply with Military Standard (MIL-STD) 1399. Also, the high voltage DC buss fed to the DC-DC converter generally is unregulated and fluctuates with line voltage, thereby placing the burden on the DC-DC converter to operate from a 2:1 line range. Furthermore, the output of these known AC-DC converters often are line regulated, requiring a relatively large voltage on the output rectifiers due to the necessary transformer turns ratio. This line regulation requirement often prohibits the optimization of the output state with lowest possible drop Schottky diodes, resulting in a less-than-optimal efficiency and higher power dissipations than otherwise.

Another limitation of many known relatively low voltage power converters is their lack of power factor correction (PFC). This lack of PFC often prevents the power circuitry from achieving optimum performance and meeting critical specifications of the load to which the power converter is connected. Higher voltage (typically above 300 VDC) AC-DC converters can implement PFC relatively easily, since boost or buck-boost style front end can be used to produce a relatively high intermediary voltage. However, the method most typically employed to convert this higher level intermediary voltage to a lower DC output voltage includes placing DC-DC converter in series with the AC-DC converter, thereby increasing the complexity, cost, and power dissipation of the power converter.

Additionally, known power converters typically are not adapted to change their output voltage relative to loading effects, such as a change in the load requirement of a load. Likewise, known power converters generally are incapable of preparing for a heavy load requirement before it occurs. As a result, either a single power converter is adapted to constantly supply an amount of power equivalent to the maximum load requirement of a load or multiple power converters constantly supply a total amount of power equivalent to the maximum load requirement, wasting power in either case. Alternatively, known power converters may be adapted provide only an adequate amount of power for average use. As a result, undesirable operation of the load may occur during heavy loads in excess of the average load requirement. Additional limitations of known power converters include: an inability to produce the desired DC output from a DC input; implementing only a fail signal for the status of the converter, rather than providing built-in test (BIT) or built-in test equipment (BITE) information.

Furthermore, many such power management systems, especially radar systems, make use of voltage regulators to provide a regulated voltage to the one or more loads. However, to account for any temporary increases, or "pulses," in the power consumption by the load, these voltage regulators often include relatively large capacitive elements (e.g., capacitors) both at the input and the output of the voltage regulator to provide stored energy for use during these temporary increases in power consumption. While useful in compensating for the increased power consumption by the load and in preventing the voltage regulator from "dropping out," these relatively large capacitors often prove cumbersome, both in the space they occupy and the cost of their implementation.

The size and cost of these capacitors is of particular significance in radar systems, which often utilize thousands of voltage regulators having both input and output capacitors. As a result, the size of the capacitors has a significant relation to the resulting size of the radar antenna assembly, and as discussed previously, smaller radar systems often provide significant advantages compared to larger radar systems. Likewise, larger capacitors often are more expensive and often generate more heat, while purchasers/operators of radar systems typically seek to minimize both the cost of manufacture and the infrared signature of radar systems.

Accordingly, a system and/or method for improved management of power to variable loads would be beneficial.

SUMMARY OF THE INVENTION

The accompanying drawings are included to provide a further understanding of the invention and are incorporated in and constitute part of this specification. The drawings illustrate several exemplary embodiments of the invention and, together with the description, serve to explain the principles of the invention. It will become apparent from the drawings and detailed description that other embodiments, objects, advantages and benefits of the invention also exist.

In a power conversion unit for converting power for use by a variable load, a power conversion unit is provided in accordance with one embodiment of the present invention. The power conversion unit comprises a power conversion circuit having an AC-DC converter having an input and an output and being adapted to convert an AC voltage to an intermediary DC voltage and a DC-DC converter having an input electrically coupled to the output of the AC-DC converter and an output electrically coupled to the variable load, the DC-DC converter being adapted to convert the intermediary DC voltage to an output DC voltage. The power conversion unit further comprises a controller in electrical communication with the power conversion circuit, the controller being adapted to change the output DC voltage from a first voltage to a second voltage based at least in part on information related to the variable load.

In a power management system, an apparatus is provided for converting power having a first form to power having a second form and for providing the power having the second form to at least one variable load in accordance with another embodiment of the present invention. The apparatus comprises a power conversion circuit adapted to convert power having the first form to power having the second form, and means for controlling an output voltage of the power conversion circuit based at least in part on a predicted change in a load requirement of the at least one variable load.

In yet another embodiment in accordance with the present invention, a method for providing power to a variable load using at least one power conversion unit is provided. The method comprising the steps of providing power having a first voltage from the at least one power conversion unit to the variable load at a first time, wherein the first voltage is based on a load requirement of the variable load and determining a second voltage based at least in part on a predicted change in the load requirement of the variable load occurring at a second time subsequent to the first time. The method further comprises the step of temporarily providing power having the second voltage to the variable load at a third time at least prior to the second time and subsequent to the first time.

One advantage of at least one embodiment of the present invention includes minimized power consumption by anticipating a predicted load requirement and providing an adequate amount of power accordingly. Another advantage of the present invention includes minimized power dissipation by activating and deactivating a power converter in accordance with the power requirements of a load. Yet another advantage includes an improved lifespan of the power conversion unit.

Additional features and advantages of the invention will be set forth in the description that follows, and in part will be apparent from the description, or may be learned by practice of the invention. The objectives and other advantages of the invention will be realized and attained by the systems and methods, particularly pointed out in the written description and claims hereof as well as the appended drawings.

DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

The purpose and advantages of the present invention will be apparent to those of ordinary skill in the art from the following detailed description in conjunction with the appended drawings in which like reference characters are used to indicate like elements, and in which:

FIGS. 3 and 4A are schematic diagrams illustrating exemplary mechanisms to increase an output voltage supplied by a power conversion unit in anticipation of an increase in power consumption by a variable load in accordance with at least one embodiment of the present invention;

FIG. 4B is a waveform diagram illustrating an exemplary operation of the mechanisms of FIGS. 3 and 4A in accordance with at least one embodiment of the present invention;

DETAILED DESCRIPTION OF THE INVENTION

Figure 1:
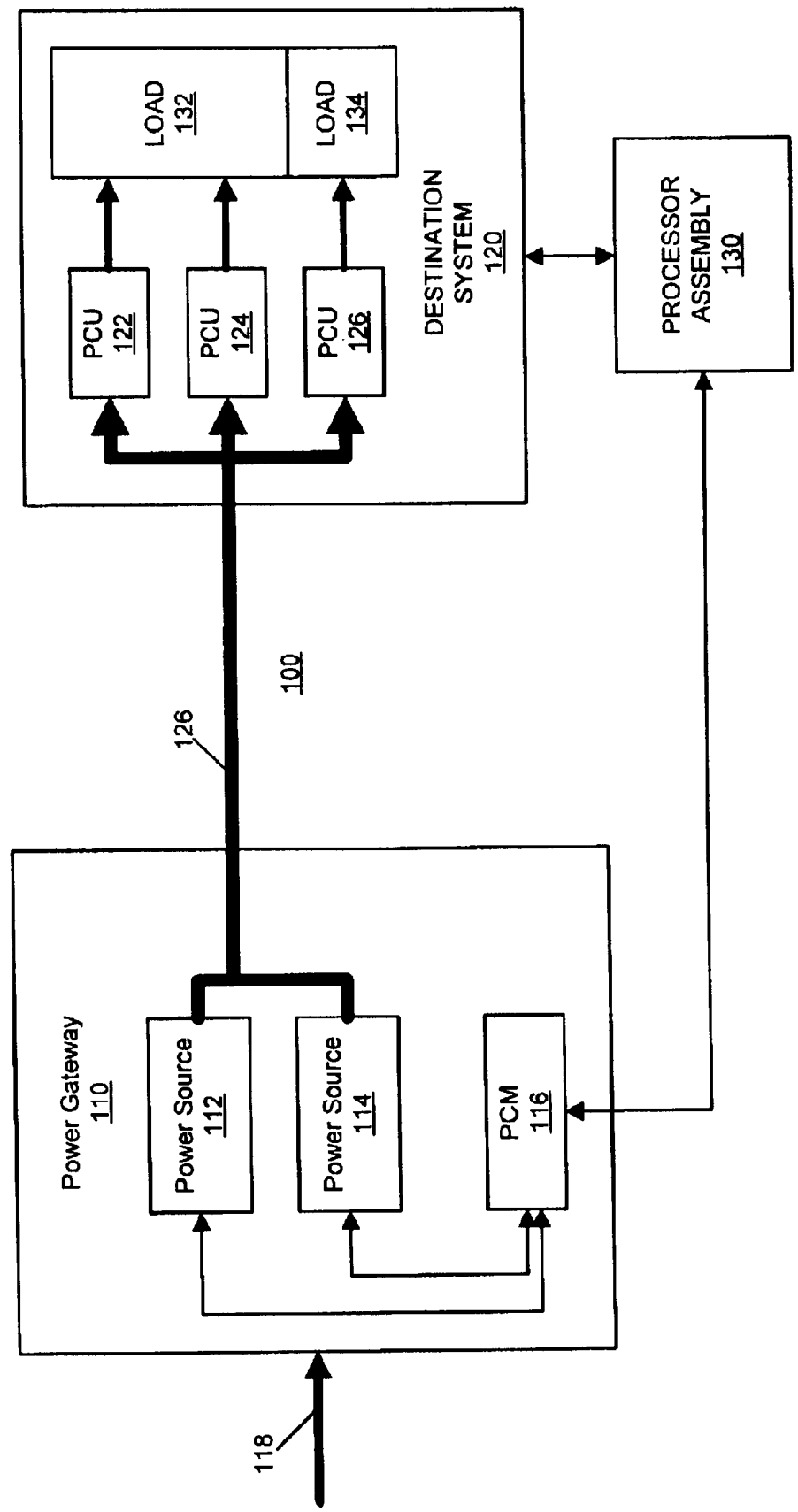
FIG. 1 is a schematic diagram illustrating an exemplary power management system in accordance with at least one embodiment of the present invention.

FIGS. 1–8 illustrate a system and a method for efficient management of power for one or more variable loads. In at least one embodiment, power having a first form is supplied to one or more power conversion units (PCUs) connected to the one or more variable loads. The PCUs are adapted to convert the power from the first form to other forms suitable for use by the components of the destination system. This conversion operation can include converting from single-phase or three-phase AC power to DC power, converting from DC power to AC power, converting from a higher magnitude voltage to a lower magnitude voltage, converting from high-voltage DC (HVDC) power to low-voltage DC power (LVDC), etc. In at least one embodiment, a power control module is adapted to monitor the load requirements, both present and future, of the one or more variable load. Based on the load requirements, the power control module controls the operation of the one or more PCUs. Should the load requirement of the destination system decrease, the power control module can deactivate or take offline one or more of the PCUs. Alternatively, should the load requirement increase, the power control module then can activate or put online one or more inactive power conversion units. The term "deactivate," as used herein, refers to manipulating a PCU such that the PCU subsequently provides substantially no power to one or more variable loads. This manipulation can include powering down the PCU completely such that the PCU is non-operational, thereby minimizing the power draw of the PCU itself, or the PCU can be switched to a standby mode, whereby minimal operations are performed by the PCU while "turned off." Conversely, the term "activate," as used herein, refers to adapting the PCU to provide output power to one or more variable loads to which it is connected. This can include signaling the PCU to convert from a standby mode to a fully operational mode, providing a power to the PCU to bring the PCU online, and the like.

Additionally, in at least one embodiment, the power control module, based on a predicted temporary change in the power consumption of a variable load, directs one or more of the PCUs to change their output voltages to provide additional energy or reduce the amount of power available. For example, in anticipation of a predicted temporary increase in power consumption, one or more PCUs can "ramp-up" their output voltage to provide additional energy to the one or more variable loads or an intermediary between the PCU and the one or more variable loads. Further, in one embodiment one or more voltage regulators are utilized to provide a regulated voltage or voltages from the PCU to the one or more variable loads. In this case the voltage regulator can include an input capacitor coupled to the output of the PCU. As a result of the additional energy supplied by the ramped-up output voltage from the PCU, smaller input capacitive elements, as compared to previous systems, can be implemented by the voltage regulators to provide power during temporary increases in power consumption. Likewise, in at least one embodiment, the output voltage of the voltage regulator is ramped-up in a similar fashion during, or in anticipation of, an increase in the power draw to minimize voltage droop, thereby allowing smaller capacitive elements to be implemented at the output of the one or more voltage regulators.

The terms "ramp-up," "ramped-up,' and the like, as used herein, refer to an increase in the magnitude of the output voltage of the PCU or the voltage regulator, as appropriate. For example, in some cases, the PCU or voltage regulator may provide an output voltage having a negative voltage level to the one or more variable loads. Accordingly, to provide additional energy directly to the variable load or to an intermediary, the magnitude of the output voltage can be ramped-up, thereby causing the output voltage to become more negative. The increase in the magnitude of the output voltage when ramped-up can occur in a variety of ways. For example, in one embodiment, the voltage is increased almost instantaneously from the previous voltage to the desired voltage. However, in many systems having variable loads, such a rapid increase in voltage often can have an undesirable effect on the operation of the system. Accordingly, as known in the art, the magnitude of the output voltage can be increased relatively slowly depending on the particular application. It will be appreciated that the magnitude of the output voltage of a PCU can be decreased in anticipation of a predicted temporary decrease in the load requirements of a variable load. Accordingly, compensation for a temporary decrease in power consumption by decreasing the magnitude of the output voltage of a PCU can be implemented, using the guidelines provided herein, without departing from the spirit or scope of the present invention.

The present invention is particularly advantageous when implemented in radar antenna systems due to the substantial variance in power consumption exhibited by such systems, as well as the common requirement that the radar antenna assemblies of radar systems occupy as little space as possible and/or have as low an infrared signature as possible. FIGS. 5–8 illustrate an implementation of the present invention in a radar antenna system.

Although an exemplary implementation of the present invention in radar antenna systems is described herein in detail, the present invention is not intended to be limited to such systems, and may be beneficially implemented in any of a variety of systems or devices having variable load requirements. For example, the present invention may be implemented in managing power for a large bank of multi-tasking microprocessors, where the load requirements of individual microprocessors and the bank as a whole change frequently during the computing process. The power management system for the bank of microprocessors could be adapted to direct individual PCUs to ramp up their output voltages in anticipation of a temporary increase in activity by one or more microprocessors, or activate/deactivate a subset of PCUs when the nominal power requirements of the microprocessor bank changes. Similarly, the present invention could be used in digital communications devices, temperature control circuits, and many other systems having varying and/or rapidly changing loads.

Referring now to FIG. 1, a system for efficient management of power is illustrated in accordance with at least one embodiment of the present invention. As illustrated, system 100 includes a power gateway 110, a destination system 120, and a processor assembly 130. The power gateway 110 includes at least one power source, such as power sources 112, 114, and a power control module (PCM) 116. The destination system 120 includes one or more power control units (PCUs) 122–126 and one or more variable loads 132, 134. The quantity and arrangement of the PCUs 122–126 and the loads 132, 134 are for illustrative purposes. Any number of PCUs may be utilized to provide power to any number of variable loads, as appropriate, in accordance with the present invention.

System 100, in at least one embodiment, is used to condition and distribute power from the power gateway 110 to the loads 132, 134 of the destination system 120. Power is generated at the power gateway 110, provided to the destination system 120 via a power transmission medium 126, and then utilized by the destination system 120. The power transmission medium 126 can include any medium suitable for the transmission of electrical energy, such as cables or wires comprised of a conductive material, such as copper or aluminum. Mechanisms for transmitting electrical energy are numerous and well known to those skilled in the art.

The power gateway 110 can generate power for consumption by the destination system 120 using one or more power sources 112, 114. The power sources 112, 114 can include any of a variety of power generation devices, such as a diesel generator, a hydroelectric generator, a wind turbine, a gas turbine, a solar panel, a nuclear reactor, a fuel cell, and the like. In addition to, or instead of, utilizing power generated by power sources 112, 114, the power gateway 110 can utilize external power supply 118 to provide power to the destination system 120. For example, power gateway 110 could be connected to a terrestrial power supply (one embodiment of external power supply 118), such as conventional commercial or industrial power distribution systems or grids, and utilize power provided by this terrestrial power supply to supply power to the destination system 120 during normal operation. However, in the event of a loss of or irregularity in the external power supply 118, the power gateway 110 can be adapted to switch to power supplied by two alternate power sources 112, 114, such as diesel generators, to provide uninterrupted power to the destination system 120.

The power received by the destination system 120, in one embodiment, is routed to the power conversion units (PCUs) 122–126. Each PCU is adapted to convert the power from the power gateway 110 and supply the converted power to one or both of the loads 132, 134. The loads 132, 134 represent the variable loads corresponding to one or more electromechanical components of the destination system 120. For example, loads 132, 134 can represent the power requirements resulting from the operation of a motor, a servo, an electrical circuit, and the like. In at least one embodiment, one or more of the PCUs 122–126 convert the supplied power from a first form to a second form. For example, the power supplied to the destination system 120 could include three-phase alternating current (AC) power but the loads 132, 134 are adapted to consume direct current (DC) based power. In this case, the PCUs 122–126 can include an AC-to-DC converter to convert the power from its original form (three-phase AC power) to a useful form (DC power) for use by the loads 132, 134. The PCUs 122–126 additionally can include a DC-to-DC converter to step-down or step-up the voltage of the supplied power. Various embodiments of the PCU are discussed in detail below with reference to FIG. 8.

As illustrated in FIG. 1, the PCUs 122, 124 provide power to load 132 and the PCU 126 provides power to load 134. Multiple PCUs can be adapted to provide power to a single load. Assuming the load 132 has a maximum power consumption of 2 kilowatts (kW) and each PCU is adapted to supply, for example, a maximum of 1 kW of power, then the PCU 122 and the PCU 124 can be placed in parallel to provide 2 kW total to the load 132. Likewise, multiple PCUs can be used to provide redundancy. For example, if the load 132 consumes 1 kW of power and the PCUs 122, 124 each are capable of providing 1 kW of power, then one of PCUs 122, 124 can fail without causing an undersupply of power to the load 132.

Although FIG. 1 illustrates one embodiment wherein the power supplied by the PCUs 122–126 is provided to different loads, in another embodiment, the power supplied by the PCUs 122–126 is consolidated and supplied to the loads 132, 134 as needed. For example, PCUs 122–126 capable of supplying 1 kW can be connected in parallel to a buss for a total supply of 3 kW. A portion of the total power then can be supplied to each of the loads 132, 134 from the buss, as necessary.

It will be appreciated that the load requirement of a destination system can vary as the operation of the destination system varies. For example, the activation of servos or environmental conditioning units, transmission of radio signals, and the like, can cause the power consumption of a destination system to increase and decrease in a set or seemingly random pattern. As a result, many known power management systems typically supply an amount of power equivalent to the full capacity power consumption of the destination system during the entire operation of the destination system. Due to inefficiencies in the supply and power circuit, power is wasted during periods when the destination system is not operating at full capacity. Furthermore, the constant provision of full-capacity power is likely to decrease the lifespan (e.g., the mean-time-before-failure or MTBF) of some or all of the component of the system 100.

To prevent wasted power, in at least one embodiment, the power gateway 110 includes a power control module (PCM) 116 adapted to manage the supply of power to the destination system 120. The PCM 116 can include any of a variety of control mechanisms, or a combination thereof, such as a microcontroller, a programmable logic device, a programmable logic controller, an application specific integrated circuit (ASIC), discrete logic, software or firmware executed by a microprocessor, and the like.

In order to manage the supply of power to the destination system 120, the PCM 116 can be adapted to monitor the power consumption of the destination system 120 and to provide a proportional amount of power to the destination system 120 by controlling the conversion operations of the PCUs 122–126, as well as the operation of the power gateway 110. As discussed subsequently with reference to FIGS. 2 and 3, the PCM 116 can control the conversion operations of the PCUs 122–126 by directing the PCUs 122–126 to provide power at one or more voltage levels. Alternatively, control of the conversion operations can include activating/deactivating one or more of PCUs 122–126 in response to an increase/decrease in the consumption of power by the destination system 120. By deactivating a PCU during periods of lower power consumption, the overhead power consumption resulting from the idle operation of the PCU, such as current leak in the components of the PCU, can be minimized or eliminated, thereby improving the overall efficiency of the power distribution system.

Additionally, the PCM 116 can control the conversion operations of the PCUs 122–126 by directing a ramp-up in the voltage supplied by the PCUs 122–126 prior to an occurrence of a temporary increase in power consumption by one or both of the loads 132, 134. This ramped-up voltage then can be used to store additional energy in a capacitive element at the input to the load. The additional energy in the capacitive element then can be used to compensate for the imminent or anticipated temporary increase in power consumption by the load. For example, if the power consumption of the destination system 120 is to increase significantly one millisecond (ms) after a certain time (such as when a servo is activated), the PCM 116 can direct the PCUs 122–126 to increase their output voltage by a certain amount in advance of the certain time to increase the charge stored in input capacitors at the loads 132, 134 such that when the power consumption of the loads 132, 134 increases one millisecond later, the output power of the PCUs 122–126, in conjunction with the additional energy stored in the input capacitors, will be sufficient for the increased power consumption.

In one embodiment, representations of the load requirements of the destination system 120 are supplied to the PCM 116 by the processor assembly 130. In the illustrated embodiment, the processor assembly 130 includes the central control component of the destination system 120. Accordingly, in at least one embodiment, the processor assembly 130 provides information regarding the future operation of the destination system 120. For example, the processor assembly 130 could determine that a servo motor is to be activated within one millisecond. Based on this knowledge, the processor assembly 130 could send information indicating the imminent or anticipated activation of the servo motor to the PCM 116. Using this information, the PCM 116 can then direct the conversion operations of the PCUs 122–126, such as by increasing the voltage or activating additional PCUs, to increase the power supplied to the destination system 120 in preparation for the increased load requirement of the destination system 120 caused by the activation of the servo motor.

Likewise, the anticipated load requirements of the destination system 120 could be determined from a planned operation of the destination system 120. For example, the processor assembly 130 could be adapted to implement one or more software/hardware programs used to control the operation of the destination system 120. In this case, the processor assembly 130 could be further adapted to analyze the programs to determine the timing of load requirement changes and/or the magnitude of the changes. Using this information, the processor assembly 130 could send data representative of a future operation of the destination system 120 to the PCM 116, and the PCM 116 then could predict the future load requirements of the destination system 120 based on the future operation. Alternatively, the processor assembly 130 could send data representative of the future load requirement(s) of the destination system 120 to the PCM 116, and the PCM 116 then could manage the PCUs 122–126 to provide the power as anticipated.

Rather than use information provided by the processor assembly 130 to determine the future load requirement of the destination system 120, in one embodiment, the PCM 116 predicts a future load requirement of the destination system 120 based on a set pattern or sequence, such as by analyzing historical data or trending. For example, if the load requirement of the destination system 120 is cyclical or sequential in nature, then the PCM 116 can determine the current position of the destination system 120 within the cycle/sequence, and determine a predicted load requirement from the next position in the cycle/sequence. Alternatively, in embodiments wherein the change in power consumption by the loads 132, 134 is relatively slow, the PCM 116 can monitor the consumption of power by the loads 132, 134 and adjust the conversion operation of the PCUs 122–126 accordingly. For example, when the PCM 116 has determined that the load requirement has increased past a first threshold, the PCM 116 can activate a previously inactive PCU to provide an increased amount of power to the destination system 120. Likewise, when the load requirement falls below a second threshold, the PCM 116 can deactivate a previously active PCU to decrease the power supplied to the destination system 120 in response to the decrease in power consumed, thereby reducing energy wasted to the overhead energy costs of an operational but unnecessary PCU.

Figure 2:
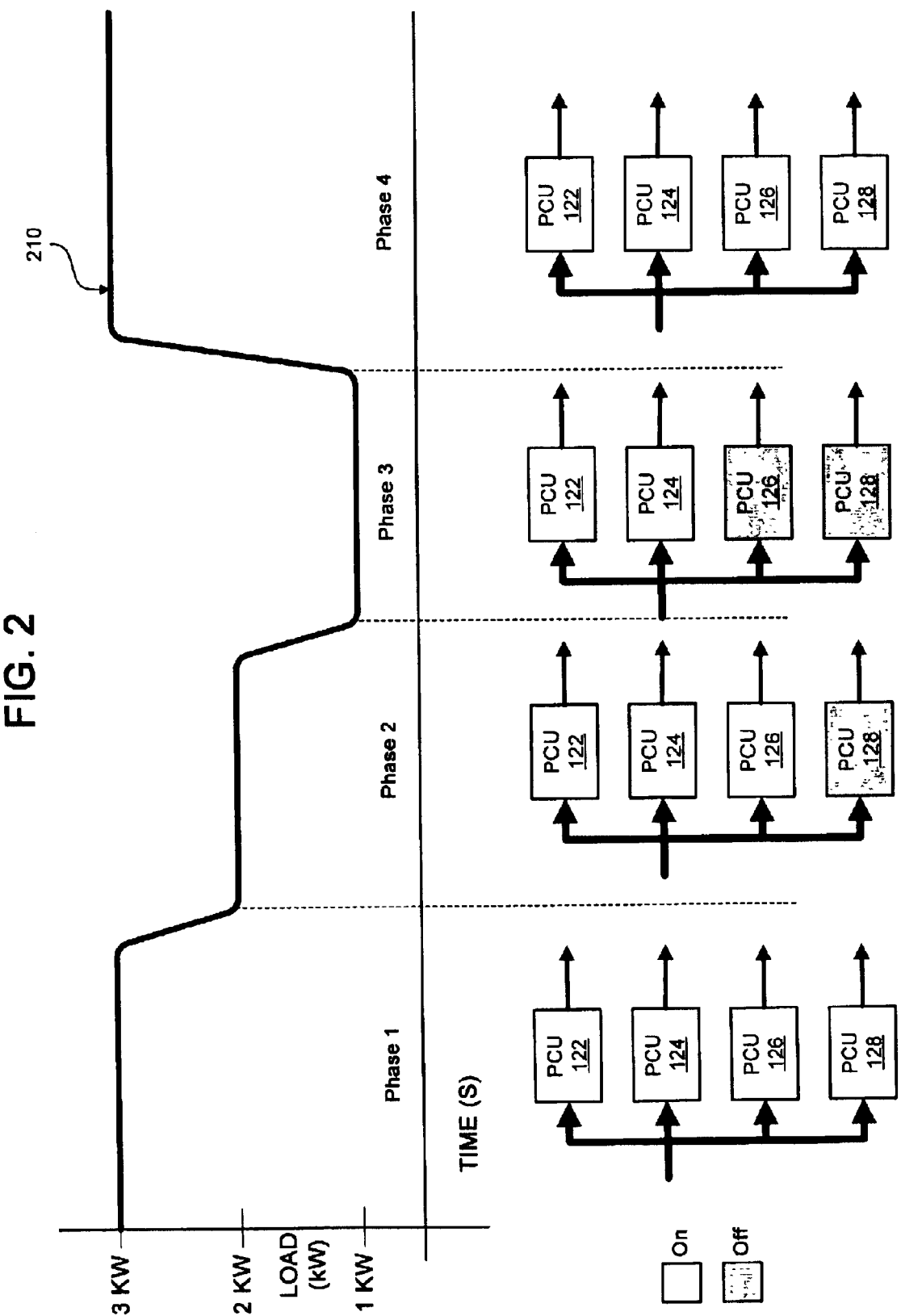
FIG. 2 is a schematic diagram illustrating an exemplary mechanism to control an amount of power supplied to a destination system in response to a variable load requirement of the destination system in accordance with at least one embodiment of the present invention.

Referring to FIG. 2, an exemplary mechanism for efficient provision of power to a variable load is illustrated in accordance with at least one embodiment of the present invention. As discussed previously, a power control module (PCM), such as PCM 116 of FIG. 1, can be used to control the conversion operation of one or more power conversion units (PCUs) to provide power to a variable load in proportion to the variable power consumption by the load. Graph 210 illustrates an exemplary power consumption over time by a destination system, such as destination system 120 of FIG. 1, having variable load requirements. In the exemplary illustration, the destination system consumes 3 kW of power during phases 1 and 4, 2 kW during phase 2, and 1 kW during phase 3.

Known power distribution systems typically would make a total of at least 3 kW available during all four phases, resulting in wasted power during phases 2 and 3. However, in at least one embodiment of the present invention, a PCM controls the operation of the PCUs 122–128 connected to the destination system so that the power supplied to the destination system during phases 1–4 corresponds to the consumption of power during each phase. As illustrated, in one embodiment, the PCM determines in advance the load requirement of the destination device during the corresponding phase. Based on this load requirement, the PCM can select a subset of the PCUs 122–128 for each phase having a power output adequate for the load requirement during that phase. At the start of each phase, the PCM can deactivate the PCUs not included in the selected subset, thereby minimizing wasted power. Conversely, the PCM directs the selected PCUs of the subset to remain active to provide power to the destination system. The number of PCUs selected to remain active can include additional PCUs in excess of the number of PCUs required for the load requirement, thereby providing redundancy in the event of a failure of one or more of the PCUs. Alternatively, in at least one embodiment, the PCUs are adapted to be brought online relatively quickly. Accordingly, a previously inactive PCU can be turned on to compensate for a failed PCU or an expected increase in power consumption.

For the following discussion, assume that each of PCUs 122–128 are capable of generating 1 kW of power and that PCUs 122–128 are connected in parallel to the destination system. During phase 1, the PCM directs PCUs 122–128 to remain on, resulting in a maximum of 4 kW of power available to the destination system. Since the load requirement (illustrated by line 210) of the destination system is only 3 kW during phase 1 but the total available power is 4 kW, one of PCUs 122–128 can fail without the total available power falling below 3 kW. During phase 2, the load requirement of the destination system falls to 2 kW. Accordingly, the PCM directs PCU 128 to deactivate during phase 2. As a result, the total available power drops to 3 kW during phase 2, while still providing redundancy in the event of a failure of one of PCUs 122–126. During phase 3, the power consumption drops further to 1 kW. During this phase, the PCM directs PCU 126 to deactivate during phase 3 and directs PCU 128 to remain off during phase 3. As a result, during phase 3, the total available power is 2 kW for a power consumption of 1 kW, allowing for one of PCUs 122–124 to fail while still providing the necessary 1 kW of power. During phase 4, the load requirement of the destination system increases back to 3 kW, so the PCM reactivates PCUs 126, 128 so that the total power available again is 4 kW, allowing for one of PCUs 122–128 to fail without affecting the operation of the destination system. Should redundancy be unnecessary, some additional PCUs could be deactivated to reduce the waste further.

By activating/deactivating one or more of the PCUs 122–128 in response to the variable power consumption of a destination system, the PCM 116 can reduce the overhead power consumption resulting from the operation of unnecessary PCUs. Additionally, those PCUs that are otherwise inactive during a normal operation of the destination systems can be turned on in the event of a failure of one or more PCUs. For example, if PCU 122 failed during phase 3, then the previously inactive PCU 126 could be activated to take the place of the failed PCU 122, thereby retaining the redundancy of an additional active PCU in excess of the power requirements of the destination system. Furthermore, the PCM 116 can be adapted to alternate the active PCUs with the inactive PCUs to lengthen the operational lifespan of the PCUs as well as to ensure that all PCUs are operational for times when additional PCUs are required to provide power.

Referring now to FIGS. 3–4B, an exemplary mechanism for controlling the conversion operation of a PCU in anticipation of a predicted temporary change in power consumption is illustrated in accordance with at least one embodiment of the present invention. As discussed previously, the power control module (PCM) 116, in one embodiment, determines in advance a future load requirement of a destination system at a certain time or for a certain time period and then adjusts the voltage output of one or more PCUs in advance to provide adequate power.

As discussed in greater detail below, in at least one embodiment, the output of a PCU is provided to a voltage regulator 410 (FIG. 4) and the regulated output voltage of the voltage regulator 410 then is provided to a load. During temporary increases in the power consumption by a load the output of the voltage regulator in known systems often exhibits considerable voltage droop. To minimize the voltage droop, these known systems typically include relatively large capacitive elements or networks at the input and the output of the voltage regulator to provide stored energy and thereby minimize the voltage droop during temporary increases in power consumption. However, these capacitive elements/networks generally are relatively large, resulting in an increased size and cost of a known system implementing such voltage regulators. However, by increasing the voltage provided to the input capacitor 412 of the voltage regulator 410 prior to a temporary increase in power consumption, additional energy can be stored in the input capacitor 412 than could be stored if the voltage remained constant. Since additional energy can be stored in the input capacitor 412 by ramping up the voltage provided to the input capacitor 412, the voltage regulator 410 can implement smaller input capacitors compared to known voltage regulators while still providing adequate power to a load and/or minimizing voltage droop. Since the energy storage in a capacitive element, such as input capacitor 412, typically is proportional to the square of the voltage across the capacitive element, it will be appreciated that the storage of the necessary additional energy can be achieved with a relatively minor increase in output voltage of the PCU.

Likewise, the voltage output of the voltage regulator 410 can be increased to increase the charge available in an output capacitor 414 connected to the output of the voltage regulator 410. In this case, the PCM can direct the voltage regulator 410 to ramp-up its output voltage in advance of a temporary increase in power consumption by a load. As a result, a smaller output capacitor 414 can be used, thereby reducing the size and/or cost of the voltage regulator 410. As with a ramp-up of the voltage of a PCU, the voltage regulator 410 can use historical data, a predefined pattern, or input from another component (such as a PCU, the PCM 116 or the processor assembly 130) to predict or estimate an anticipated increase in power consumption and ramp-up its output voltage accordingly.

To illustrate an exemplary change in the output voltage of the PCU 122 in anticipation of a predicted temporary change in power consumption, graph 310 of FIG. 3 reveals an exemplary plot (voltage plot 304) of the voltage output by the PCU 122 superimposed on an exemplary plot (power plot 302) of the power consumption of a load 132 connected to the voltage regulator 410. The ordinate of graph 310 represents time and the abscissa represents voltage magnitude for voltage plot 304 and power consumed for power plot 302. In this example, the power consumption of the load 132 temporarily "pulses" for three time periods, herein referred to as power pulses 332–336. To compensate for the power pulses 332–336, the PCM 116, in one embodiment, directs the PCU 122 to produce a number of voltage pulses 322–326 corresponding to the power pulses 332–336. Note that although the power pulses 332–336 and the voltage pulses 322–326 are illustrated in FIG. 3 as having substantially square wave configurations for ease of discussion, the power pulses 332–336 and the voltage pulses 322–326 can have any number of configurations, including a sinusoidal, saw wave, and irregular configurations. Similarly, the voltage pulses 322–326 may have similar or dissimilar configurations compared to the configurations of the power pulses 332–336.

At time 312a, the PCM 116 directs the PCU 122 to increase its output voltage by the voltage difference 308 (illustrated by the voltage pulse 322) in anticipation of a temporary increase (increase magnitude 306) in the power consumption by the variable load 132 (e.g., the power pulse 332) starting at time 312b. As discussed previously, in one embodiment, the PCM 116 predicts the future load requirements of a variable load based on input from the processor assembly 130. For example, the processor assembly 130 could send a signal to the PCM 116 prior to time 312b, the signal indicating the imminent or anticipated occurrence of the pulse 322. Based on this signal, the PCM 116 can then direct the conversion operation of the PCU 122 to increase its output voltage by voltage difference 308 at time 312a. Similarly, in another embodiment, the PCM 116 can predict the occurrence of the pulse 332 based on a sequence or cycle known to the PCM 116. For example, pulses 332–336 can occur in a cyclical fashion, and by determining where the operation of the destination system is within this cycle, the PCM 116 can predict when the next pulse is to occur and respond with anticipatory voltage pulses 322–326.

The difference between the start of the ramp-up voltage pulse 322 (time 312a) and the start of the power pulse 332

(time 312b) can be based on any number of factors, such as the response time of the PCU 122 to direction from the PCM 116, charge rate of the input capacitor 412, the rate at which the power consumption increases, the rate at which the output voltage of the PCU 122 increases, and the like. For example, the input capacitor 412 may need to considerably increase its stored charge in anticipation of a power pulse 332 of a relatively long duration. Accordingly, the start of ramp-up of the output voltage (time 312a) may occur considerably earlier compared to the start of the power consumption increase (time 312b) to allow the input capacitor 412 to achieve its maximum charge storage. Alternatively, if the ramp-up of the voltage pulse 322 occurs relatively fast and the voltage difference 308 is relatively small, there may be little or no difference between the occurrence of time 312a and time 312b.

In the illustrated embodiment, the increase in the voltage of the output of the PCU 122 (e.g., the voltage pulse 322) remains at least for the duration of the temporary increase in power consumption (e.g., the power pulse 332). As the temporary increase in power consumption terminates for the power pulse 332 at time 314a, the PCM 116 can direct the PCU 122 to ramp down its output voltage back to the original voltage level by time 314b. As with the start of the voltage pulse 322, the timing of the termination of the voltage pulse 322 can be based on a number of factors. For example, in a conservative approach, the voltage pulse 322 would continue at least through the duration of the power pulse 332, so that the voltage pulse 322 terminates (time 314b) subsequent to the termination of the power pulse 332 (time 314a). However, to minimize wasted energy, the voltage pulse 322 could ramp down to the normal level before or at the same time that the power pulse 332 dissipates.

While it may be beneficial to maintain the voltage pulse 322 for a considerable duration relative to the power pulse 332, in other embodiments, the time difference between the ramp-up of the output voltage (at time 312a) and the subsequent return of the output voltage to the nominal level (at time 314b) is relatively short compared to the duration of the power pulse 332 (time 312b to 314a). For example, the output voltage of the PCU 122 can ramp-up at time 312a and then immediately ramp back down. This short duration voltage pulse 322 can be utilized for a number of reasons. For example, the voltage difference 308 can be relatively large compared to the increase magnitude 306, thereby producing a relatively large charge at the input capacitor 412 in a relatively short time.

It will be appreciated that temporary changes in power consumption of a variable load can be negative as well as positive, and that a negative or positive temporary change often is relative. To illustrate, consider a power consumption plot represented by a square wave having a duty cycle of 50%. In this case, the power consumption can be seen as repeatedly temporarily increasing relative to the minimum power consumption level, or it can be considered to be repeatedly temporarily decreasing relative to the maximum power consumption level. Regardless, implementations of the present invention may be applied to compensate for temporary changes in power consumption, whether negative or positive. For example, the PCU 122 could be adapted to decrease its output voltage in anticipation of a predicted decrease in the load requirements of the load 132. In this case, by lowering the output voltage, the charge stored in the input capacitor 410 may be reduced, and since many types of capacitors have a parasitic energy loss proportional to their stored charge, reducing the charge stored in the input capacitor 410 may minimize the parasitic loss in the input capacitor 410 during temporary decreases in the power consumption. Likewise, the regulated output voltage of the voltage regulator 410 can be decreased in anticipation of a predicted decrease in the power consumption of the load 132. For ease of discussion, embodiments wherein temporary changes in power consumption are temporary increases in power consumption are illustrated. However, implementations of the present invention may be utilized when temporary changes in power include temporary decreases in power consumption, using the guidelines provided herein.

FIGS. 4A and 4B illustrate an exemplary mechanism for providing regulated power to a variable load. As illustrated, power from the PCU 122 is provided to the load 132 (a RF transmit/receive module in this example) via the voltage regulator 410. In at least one embodiment, an input capacitor 412 and output capacitor 414 are located at the input and output, respectively, of the voltage regulator 410. The capacitors 412, 414 represent any capacitive or energy storing device known to those skilled in the art, such as a single capacitor, a network of capacitors, and the like.

In this case, the load 132 is adapted to emit RF energy in pulses, as illustrated by RF output waveform 420 of FIG. 4B. The power provided to the load 132 by the PCU 122 is regulated by the voltage regulator 410. Known power management systems having variable loads typically use relatively large capacitors at the input and the output of a voltage regulator to store an adequate amount of energy in anticipation of temporary and/or rapid increases in the power consumption of a load, as well as to minimize the potential for voltage droop. However, the use of relatively large capacitors typically has a number of drawbacks. For one, large capacitors require considerable space. In destination systems where space is at a premium, this may prohibit the use of large capacitors. Similarly, larger capacitors often introduce undesirable circuit artifacts, such as energy loss due to parasitic resistance, in greater magnitude than smaller capacitors. Additionally, larger capacitors typically are more expensive than smaller capacitors of the same type.

However, due to the additional energy stored in the capacitors 412, 414 resulting from the ramp-up of the output voltage of the PCU 122 and/or a ramp-up of the output voltage of the voltage regulator 410, smaller and/or less expensive capacitors 412, 414 may be used to store an equivalent amount of energy compared to the larger capacitive elements implemented in known systems. Accordingly, in general, less space is needed to house the input capacitor 412 and the output capacitor 414, less cost is needed to implement the smaller capacitors 412, 414, and less waste occurs through the use of smaller capacitors for capacitors 412, 414.

To demonstrate the reduction in capacitance and/or physical size of the capacitors 412 afforded by a ramp-up of the output voltage of the PCU 122 prior to a temporary increase in the power consumed by the load 132, FIG. 4B reveals an exemplary implementation of the PCU 122 in a radar assembly. In this example, the load 132 represents a transmit/receive (TR) module adapted to output radio-frequency (RF) energy, where the RF output temporarily and rapidly changes in pulses, as illustrated by RF output waveform 420. Voltage output waveform 222A represents the typical output voltage of known power conversion units resulting from the RF output (waveform 420) of the load 132 and the voltage output 222B represents an exemplary output voltage of the PCU 122 with voltage ramping capabilities that results from the RF output of the load 132.

In this example, it is assumed that the input impedance (R) of the load 132 is 20 ohms, the nominal output voltage of the PCU 122 is 42 volts, and the minimum input voltage of the voltage regulator 410 for acceptable operation is 41.5 volts. It is also assumed that the width of the pulses of the RF output (waveform 420) is 600 microseconds (us), which also represents the minimum necessary discharge time (t) of the capacitor 412 during the RF output pulses. Based on equation EQ. 1 that relates the final voltage ($V_O$=41.5) of the capacitor 412 to the initial voltage ($V_C$=42) as the capacitor 412 discharges over time t, an equation EQ. 2 describing the relationship between the capacitance (C) of the capacitor 412 to the initial and final voltages can be obtained.

$$V_C = V_O e^{-\frac{t}{RC}} \qquad \text{EQ. 1}$$

$$C = \frac{1}{-\frac{R}{t}\ln\left(\frac{V_C}{V_O}\right)} \qquad \text{EQ. 2}$$

Using the previously assumed values ($V_O$=41.5 V, $V_C$=42 V, R=20 Ω, t=60 us) the necessary capacitance of the input capacitor 412, calculated using EQ. 2, is 2505 microfarad (uF) in the absence of voltage ramp-up prior to the RF output pulse. However, assuming that the PCU 122, in this example, ramped up the output voltage to 46 volts (i.e., $V_C$=46) prior to the RF output pulse, the necessary capacitance of the input capacitor, calculated using EQ. 2) is 330 uF, or approximately only 13% of the capacitance necessary in the absence of a voltage ramp-up. Since the physical size of a capacitor generally is roughly proportional to its capacitance, the input capacitor 412 implemented using voltage ramp-up is, in this example, approximately one-eighth of the size of the input capacitor necessary in known systems. Likewise, since the cost of same-type capacitors are also related to the their respective capacitance, the cost of implementing the input capacitor 412 can be similarly reduced. These size and cost savings can be significant, especially when multiple voltage regulators are implemented, such as in radar systems which may incorporate thousands of TR modules (load 132) and voltage regulators 410 having input and output capacitors. The necessary capacitance of the output capacitor 414 can also be reduced in a similar manner through a ramp up of the output voltage of the voltage regulator 410 prior to a temporary increase in power consumption by the load 132.

Although the present invention may be utilized to manage power in many types of systems having variable loads, the present invention finds particular benefit when adapted to manage power in a radar assembly, and more particularly when utilized in an Active Aperture Array (AAA) radar system. Radar assemblies typically have more stringent limitations, as well as limitations in addition to those typically present in most types of variable load systems. For example, while space is often a consideration for many power management systems, the environment and operational requirements of many radar systems makes the minimization of the size of the radar assembly crucial to the successful operation of the radar assembly. Likewise, radar systems often have special requirements, such as a minimization of emitted infrared energy, that further call for special considerations when designing a power distribution system. The benefits afforded by at least one implementation of the present invention when used in a radar system are illustrated with reference to FIGS. 5–8.

Figure 5:
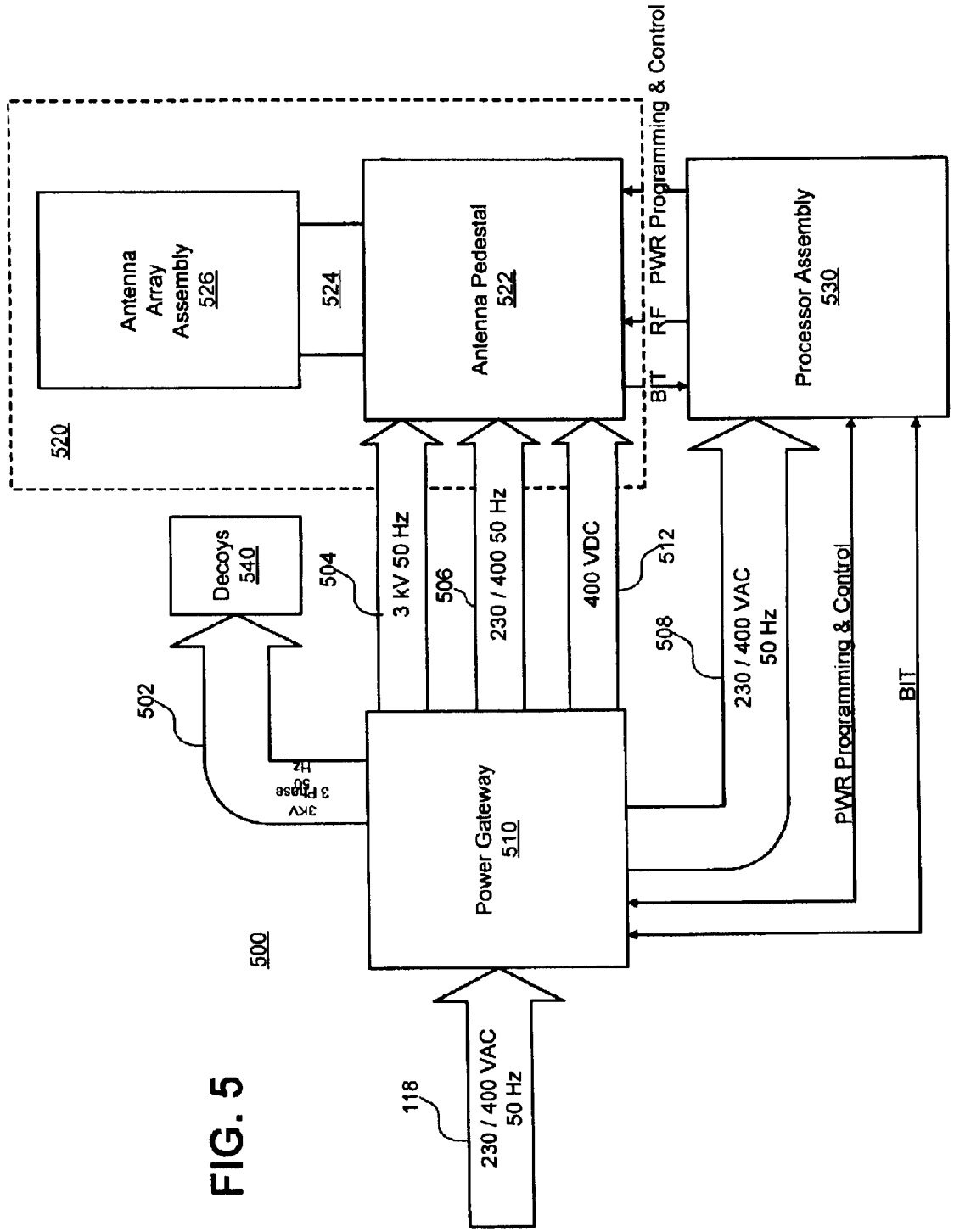
FIG. 5 is a schematic diagram illustrating an exemplary power management system adapted for use in a radar antenna system in accordance with at least one embodiment of the present invention.

Referring now to FIG. 5, a system for distributing power in an Active Aperture Array (AAA) radar system is illustrated in accordance with at least one embodiment of the present invention. The radar system 500 includes a power gateway 510 (analogous to the power gateway 110 of FIG. 1), a radar assembly 520 (analogous to the destination system 120 of FIG. 1), and a processor assembly 530 (analogous to the processor assembly 130 of FIG. 1). The radar system 500 further can include other components, including, for example, one or more decoys 540.

Figure 6:
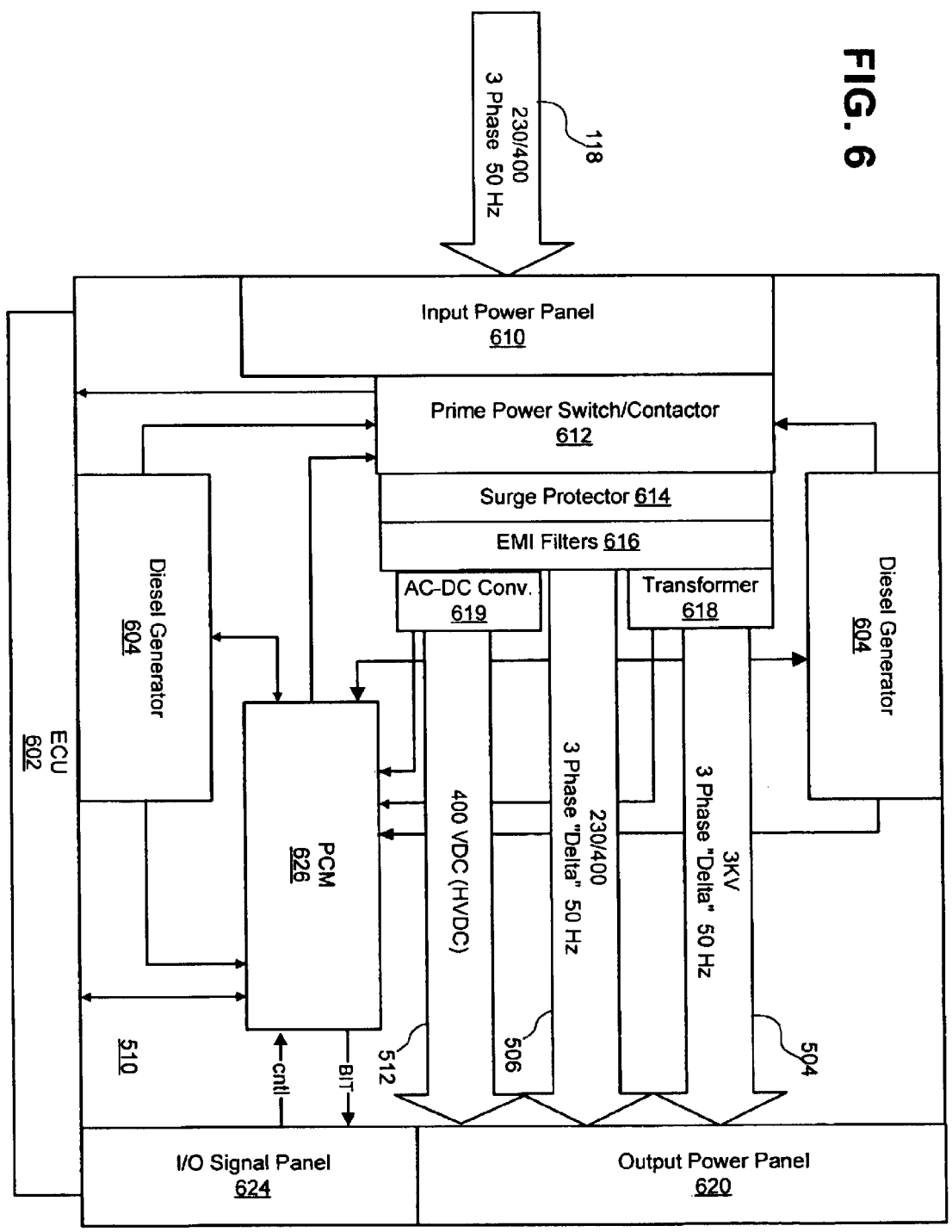
FIG. 6 is a schematic diagram illustrating a power gateway of the radar antenna system of FIG. 5 in accordance with at least one embodiment of the present invention.

The power gateway 510, discussed in detail below with reference to FIG. 6, provides power throughout the radar system 500 by obtaining power from an external source (external power supply 118), generating power, and/or conditioning power. In the illustrated embodiment, the power gateway 510 is adapted to provide power to the radar assembly 520 and the decoy 540 using power transmission mediums 502, 504, respectively, in the form of, for example, a 3 kilovolt (kV) three-phase 50 hertz (Hz) AC transmission. The power gateway 510 is further adapted to provide power to the radar assembly 520 and the processor assembly 530 in the form of, for example, a $^{230}/_{400}$ kV three-phase 50 Hz AC transmission over power transmission mediums 506 and 508, respectively. Alternatively, the power gateway 510 could be adapted to convert power from, for example, and AC form to a HVDC form (e.g., 400 VDC) and provide the HVDC power to the radar assembly over power transmission medium 512. The power transmission mediums 502–508, 512 can include any medium for transmitting electrical energy, such as conductive cables, known to those skilled in the art.

The radar assembly 520 includes an antenna pedestal 522, a slip-ring assembly 524, and an antenna array assembly 526. The antenna array assembly 526 includes a plurality of transmit/receive modules for the transmission and reception of RF energy for radar purposes, a radar signal processor to process the results of the radio wave transmissions, and the like. The antenna pedestal 522, in one embodiment, includes a mechanism for rotating the antenna array assembly 526 as well as a mechanism for distributing power input via power transmission mediums 504, 506. The slip-ring assembly 524 includes a slip-ring adapted as an interface between the antenna array assembly 526 and the antenna pedestal 522 that allows one or more connections between the antenna pedestal 522 and the antenna array assembly 526 as the antenna array assembly 526 rotates. The processor assembly 530 is adapted to control the operation of the radar assembly 520. The processor assembly 530, in one embodiment, is further adapted as a communications interface, thereby allowing remote access and/or control to the radar system 500. For example, in one embodiment, the processor assembly 530 is adapted to receive built-in test (BIT) data from the components of the radar assembly 520. Likewise, the processor assembly 530 can provide this BIT data to the power gateway 510 for analysis by a PCM. The decoy 540 can include any of a variety of radar decoys known to those skilled in the art.

Those skilled in the art will recognize that radar systems, particularly Active Aperture Array (AAA) radar systems, typically have variable power requirements. For example, during passive or inactive periods of scanning, radar systems typically consume far less power than during a long, high duty pulse mode (also known as a "fence mode"). In addition to having variable load requirements, many radar systems are mobile, thereby requiring a mobile power source or an ability to tap into a variety of power sources having different power characteristics. Therefore it is often desirable to minimize the power consumption of the radar system to minimize the size/weight of the mobile power source and/or minimize the cost of operating the radar system off of a commercial power source. Accordingly, as discussed with reference to the system 100 of FIG. 1, the power gateway 510 generates, conditions, and/or provides power to the radar assembly 520 and the processor assembly 530 based on the variable load requirements of the radar system 500, thereby minimizing excess production of power. The difference between the power generated/supplied and the power consumed can be minimized by deactivating one or more power conversion units (PCUs) of the radar system 500 deemed unnecessary to fulfill a certain load requirement during a certain time period. Likewise, the output voltage of one or more PCUs can be ramped-up in anticipation of a temporary increase in the power consumption of the radar system 500 to provide additional energy to any capacitive elements utilized by a voltage regulator coupled to the transmit/receive modules of the antenna array assembly 526, as discussed with reference to FIGS. 3–4.

To illustrate, the radar system 500 could be used to scan a section of a host nation's border with a neighboring nation or an open approach to the border. In this case, it may be unnecessary to scan the airspace of the host nation, but instead to scan only the airspace of the neighboring nation or the open border approach. Accordingly, the power requirement of the radar system 500 varies depending on the direction faced by the antenna array assembly 526 as it rotates. As a result, there is a cyclical increase and decrease in the power consumed by the radar system 500 based on the rotation. To minimize the power consumed by the radar system 500, one or more PCUs used to power components of the radar system 500 can be deactivated during low power consumption periods and activated during high power consumption periods.

Similarly, while scanning the neighboring nation's airspace, the power consumption of the antenna array assembly 526 fluctuates repeatedly as the antenna array assembly 526 transmits energy in the form of RF energy and processes the results. Accordingly, the PCUs of the radar system 500 can ramp-up their output voltage in anticipation of the increases in power consumption to compensate for the increased power consumption, as discussed previously with reference to FIGS. 3 and 4.

Referring now to FIG. 6, the power gateway 510 is illustrated in greater detail in accordance with at least one embodiment of the present invention. The power gateway 510 includes at least one environmental conditioning unit (ECU) 602, one or more diesel generators 604, an input power panel 610, a prime power switch/contactor 612, a surge protector 614, an electromagnetic interference (EMI) filter 616, a step-up transformer 618, an output power panel 620, an input/output (I/O) signal panel 624, and a power control module (PCM) 626 (analogous to the PCM 116 of FIG. 1). The power gateway 510 also can include a AC-DC converter 619 for the conversion of AC power to HVDC power or LVDC power.

In one embodiment, the external power supply 118 supplies power to the power gateway 510 via the input power panel 610. In another embodiment, power is generated by one or both of diesel generators 604 connected in parallel. Alternatively, the power gateway 510 can utilize a combination of supplied external power supply 118 and internally generated power. The prime power switch/contactor 612 can be utilized to switch between the external power supply 118 and the power supplied by the diesel generators 604. For example, the prime power switch contactor 612 can include a fused mechanical knife switch to switch the power on and off and/or between the external power supply 118 and the diesel generators 604. It will be appreciated that care should be taken to insure a proper phase rotation, frequency, and voltage of the diesel generators 604 when switching to prevent damage. In one embodiment, the prime power switch/contactor 612 is remotely controlled via a wire-based or wireless connection.

The supplied/generated power is then provided to the EMI filter 616 via the surge protector 614. The surge protector 614, in one embodiment, is adapted to protect the radar system 500 from voltage transients generated by the diesel generators 604 or the external power source 118. Likewise, the surge protector 614 can be adapted to protect against lightning strikes that introduce substantial transients. The EMI filter 616 is adapted to reduce or eliminate noise introduced by any type of electromagnetic interference. The EMI filter 616 preferably conforms to most worldwide commercial specifications and military specifications (mil-spec).

The output of the EMI filter 616 can be provided to the transformer 618, such as a step-up transformer, wherein the voltage is increased for output. With reference to the illustrated embodiment, the external power supply 118 is input as $230/400$ volt three-phase 50 Hz AC power, whereas the diesel generators 604 generate, for example, $120/208$ volt three-phase 50 Hz AC power. In either case, the step-up transformer 618 can step-up the voltage to generate, for example, a 3 kV three-phase signal at either 50 or 60 Hz. In one embodiment, the step-up transformer 618 preferably includes a Wye-to-Delta transformer having multiple taps on the primary. By using a Delta secondary, the radar system 500, as well as any personnel maintaining the radar system, can be protected from an accidental grounding at the load (i.e., the radar assembly 520).

A primary purpose of the step-up by the transformer 618 of the voltage to be supplied to the rest of the radar system 500 is to reduce the electrical current through the slip-ring assembly 524, thereby reducing the required size/weight/cost of the slip-ring assembly 524. Likewise, by reducing the current between the power gateway 510 and the radar assembly 520, smaller gauge cables can be used, thereby reducing the weight and cost of the power cables. Increasing the voltage has defense benefits as well. By reducing the current through the power cables by increasing the voltage, the infrared (IR) signature of the power cables can be reduced, making the power cables, as well as the radar system 500, less susceptible to infrared-sensing offensive weapons, such as a missile or a guided bomb. Alternatively, the AC-DC converter 619 can be utilized to convert the power supplied to the radar assembly 520 from an AC form to a DC form. Accordingly, components adapted to perform power factor correction (PFC) and components adapted to perform AC/DC conversion can be omitted from the radar assembly 520, reducing the weight of the radar assembly 520.

The output of the step-up transformer 618 and/or AC-DC converter 619 then can be provided to the output power panel 620 for distribution to the rest of the radar system 500. The output power panel 620 serves as the interface for providing power to the rest of the radar system 500. In at least one embodiment, a portion of the power provided by the diesel generators 604 and/or the external power supply 118 can by-pass the step-up transformer 618 and/or AC-DC converter 619 and be provided directly to the output power panel 620 in its original (though filtered) form for distribution.

In at least one embodiment, a power control module (PCM) 626 (analogous to PCM 116 of FIG. 1) is adapted to provide intelligent control of the operation of the power gateway 510 as well as the distribution power throughout the radar system 500. The PCM 626 can include any of a variety of processing/control devices or apparatuses, such as software or firmware executed by a processor, a microcontroller, discrete logic circuitry, a field programmable gate array, an application specific integrated circuit (ASIC), or a combination thereof. Those skilled in the art can develop a suitable PCM, using the guidelines provided herein. Input to the PCM 626 from the rest of the radar system 500 and output from the PCM 626 to the rest of the radar system 500 is routed, for example, through I/O signal panel 624, which serves as the connection point for all incoming and outgoing data signals.

Based on a variety of inputs from the components of the power gateway 510 and other components of the radar assembly 520, the PCM 626 can perform a number of monitoring functions including: monitoring the external power supply 118 (voltage, frequency, and/or phase); determining the status of the external power supply 118; determining the statuses of the generators 604; determining the status of the ECU 602; and the like. In one embodiment, this information is provided to the PCM as built-in test (BIT) or built-in test equipment (BITE) data. Using the monitoring input(s), the PCM 626 can control a variety of operations of the components of the power gateway 510, such as: opening the prime power switch/contactor 612 in the event that a fault exists; switching between the external power supply 118 and the power generated by diesel generators 604; activating/deactivating one or more of the diesel generators 604 based on the load requirements of the radar system 500; and provide BIT or BITE data to the processor assembly 530. In addition to controlling the operation of the power gateway 510, in at least one embodiment, the PCM 626 controls the conversion operation of one or more PCUs utilized to provide power to the radar assembly 520, as discussed in greater detail herein.

Figure 7:
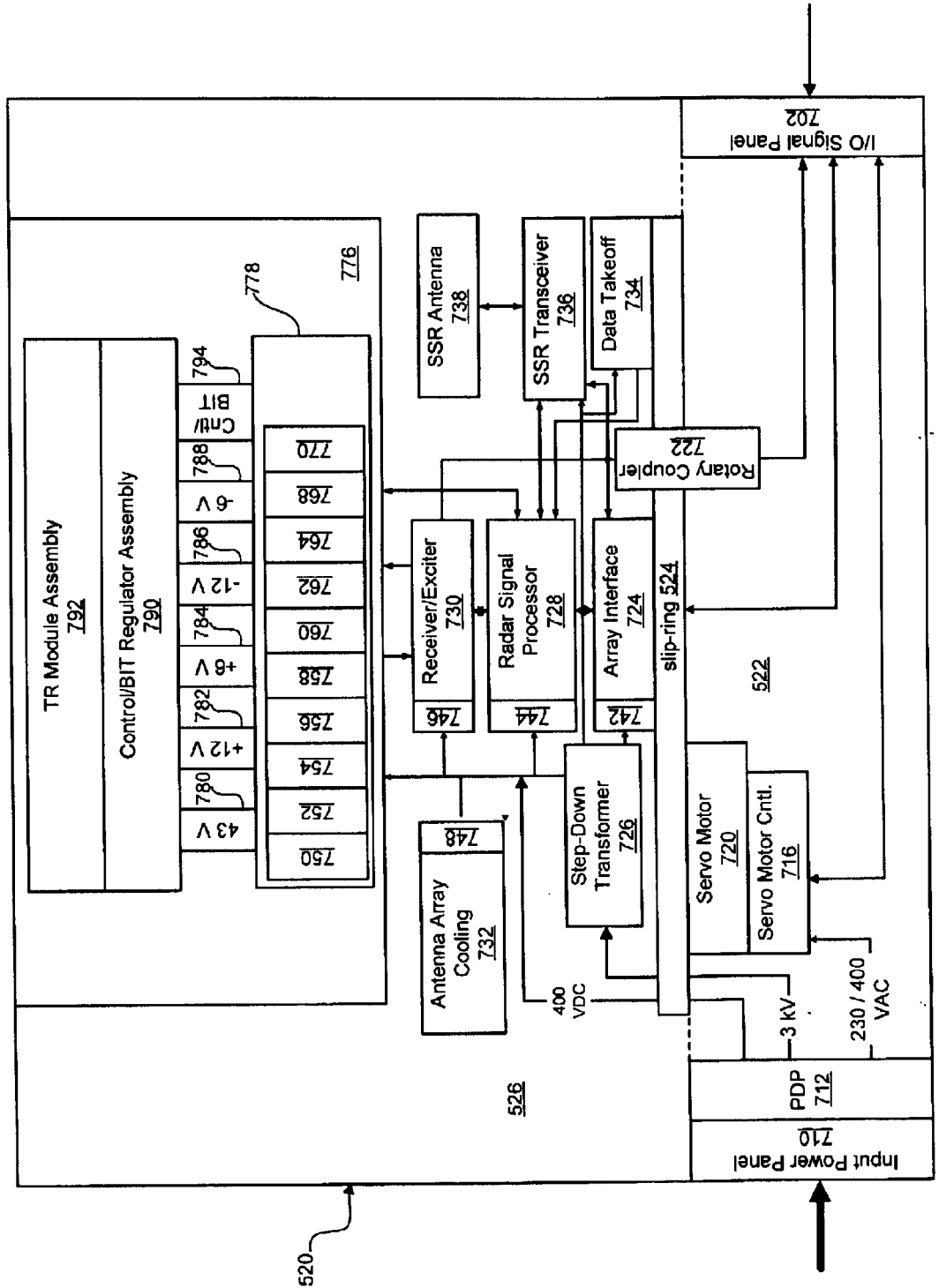
FIG. 7 is a schematic diagram illustrating a radar antenna assembly of the radar antenna system of FIG. 5 in accordance with at least one embodiment of the present invention.

Referring now to FIG. 7, the radar assembly 520 is illustrated in greater detail in accordance with at least one embodiment of the present invention. The radar assembly 520 includes the antenna pedestal 522 connected to the antenna array assembly 526 via the slip-ring assembly 524. The antenna pedestal 522 includes an input power panel 710 (analogous to the input power panel 610 of FIG. 6), a power distribution panel (PDP) 712, an I/O signal panel 702 (analogous to the I/O signal panel 624 of FIG. 6), a servo motor controller 716, a servo motor 720, and a rotary coupler 722. The antenna array assembly 526 includes an array interface 724, a transformer 726 (such as a step-down transformer), a radar signal processor 728, a receiver/exciter 730, an antenna array cooling module 732, a data takeoff 734, a secondary surveillance radar (SSR) transceiver 736, an SSR antenna 738, and an antenna array 776. The antenna array 776 includes a power feed assembly 778, a regulator assembly 790, and a transmit/receive (TR) module assembly 792 comprising one or more transmit/receive modules.

The radar assembly 520 further includes a plurality of power conversion units (PCUs) 742–748, 450–770 to supply power to one or more components of the radar assembly 520. With reference to the illustrated embodiment, the antenna array assembly 526 includes a PCU 742 connected to the array interface 724, a PCU 744 connected to the radar signal processor 728, a PCU 746 connected to the receiver/exciter 730, and a PCU 748 connected to the antenna array cooling module 732. Likewise, power feed assembly 778 of the antenna array 776 includes a plurality of PCUs 750–770.

Power supplied by the power gateway 510 is input to the radar assembly 520 via the input power panel 710, delivered via feeds 504, 506 and/or 512 from the output power panel 620 as discussed previously with reference to FIGS. 5 and 6. Recall that, in one embodiment, power in the forms of a 3 kV three-phase 50 Hz AC signal (feed 504) and a $^{230}/_{400}$ Volt three-phase 50 Hz AC signal (feed 506) are provided to the radar assembly 520. The input power signals are then supplied to the PDP 712, where the selected forms of power are distributed to the corresponding components of the radar assembly 520. The PDP 712 includes a typical PDP known to those skilled in the art and preferably includes a contactor, and emergency off switch, and a circuit breaker for the servo motor controller 716.

The $^{230}/_{400}$ VAC power provided from the power gateway 510 via the PDP 712 is supplied to the servo motor controller 716, which uses input from the processor assembly 530 (supplied via the I/O signal panel 624), to position in azimuth the antenna array assembly 526 using the servo motor 720. The 3 kV power signal from the power gateway 510 is provided to the step-down transformer 726 of the antenna array assembly 526, for instance, via the slip-ring assembly 524. Recall that, in one embodiment, a step-up transformer 618 (FIG. 6) is used to step-up the supplied voltage to minimize the current and/or IR signature between the power gateway 510 and the radar assembly 520. Accordingly, in one embodiment, the step-down transformer 726 is implemented to step-down the voltage for input by the PCUs 742–748 and the PCUs 750–770. The step-down transformer 726 preferably includes a Delta-to-Wye transformer with multiple taps on the secondary. In a preferred embodiment, the step-down transformer 726 steps down the input voltage from 3 kV AC signal at about 50 Hz to a $^{230}/_{400}$ VAC signal at either about 50 or 60 Hz. The output of the step down transformer 726 is provided to the PCUs 742–748, 750–770 for use in powering their corresponding components. Alternatively, the radar assembly 520 could be adapted to receive HVDC power via transmission medium 512. Accordingly, the transformer 726 can be omitted and the HVDC power supplied directly to the PCUs 742–748, 750–770, thereby reducing the weight of the radar assembly 520 resulting from the weight of the transformer 726.

The PCUs 742–748, 750–770, in at least one embodiment, are adapted to convert the power output from the step-down transformer from an AC form to a DC form. This conversion is discussed in greater detail with reference to FIG. 8. Alternatively, in the event that HVDC or LVDC power is supplied, the PCUs can be adapted to receive power in a higher-voltage DC form and convert the power to a lower-voltage DC form.

In at least one embodiment, the power feed assembly 778 provides power to TR module assembly 792 via the regulator assembly 790. The TR module assembly 792 includes a plurality of transmit/receive modules for transmitting and receiving radio signals for radar purposes, as directed by the receiver/exciter module 730. As noted previously, the power requirements of the radar system 500 vary with the scan mode of the radar system 500. Typically, the majority of power consumed by a radar system, such as radar system 500, is in the transmission of the radio signals. Since the timing, duration, and level of these radio signals vary frequently, the power requirement of the TR module assembly 792 also varies. As a result, the TR module assembly 792 can be viewed as a variable load analogous to loads 132, 134 of FIG. 1.

To minimize excess power consumption by the radar system 500, in at least one embodiment, a plurality of PCUs 750–770 are used to provide power to the TR module assembly 792 commensurate with its power requirements. In the illustrated exemplary implementation, the TR modules of the TR module assembly 792 require five distinct voltages to operate, +43 VDC, +12 VDC, −12 VDC, +6 VDC, and −6 VDC. The power output by the PCUs 750–770 is provided to the regulator assembly 790 via busses 780–788, each buss carrying power at one of the different voltage levels. In the illustrated embodiment, buss 780 provides power at 43 VDC, buss 782 provides power at 12 VDC, buss 784 provides power at 6 VDC, buss 786 provides power at a −12 VDC voltage and buss 788 provides power having a −6 VDC voltage. In at least one embodiment, busses 780–788 include low-impedance busses to minimize heat and power consumption by the busses themselves. Additionally, a data bus 794 can be used to provide control signals from the PCM 626, the processor assembly 530, and/or the other components of the radar assembly 520 to the regulator assembly 790 and/or the TR module assembly 792. Likewise, the data bus 794 can be used to provide BIT/BITE data from the TR module assembly 792 and the regulator assembly 790 to the processor module 530 and/or the PCM 626.

Any of a variety of methods may be used by the power feed assembly 778 to provide power from the PCUs 750–770 to the busses 780–788 at the desired voltages. One or more of the PCUs 750–770 can be assigned to a particular buss, and the output voltage of the PCU set accordingly. For example, PCUs 750–754 could be connected in parallel to buss 780 and set to a nominal output voltage of 43 V, PCUs 756, 758 could be connected in parallel to buss 782 and set to a nominal output voltage of 12 V, and so on. Multiple PCUs in parallel can provide redundancy in the event that one of the PCUs fail. Alternatively, each PCU could have a certain voltage, and the PCUs could be combined in series to provide the desired voltage on the corresponding buss. However, this could limit the redundancy in the event that a serially-connected PCU fails. Those skilled in the art can develop other methods of providing power to the regulator assembly 790 from the PCUs 750–770 over busses 780–788 using the guidelines provided herein.

In one embodiment, the regulator assembly 790 includes a plurality of voltage regulators 410 (FIG. 4) to provide power at a regulated voltage to one or more TR modules of the TR module assembly 792. The voltage regulators 410 can be paralleled within the power feed assembly 778 to provide for redundancy, and diodes can be placed at the output of each of the voltage regulators 410 to prevent a short in the event that one or more of the voltage regulators fail. The voltage regulators 410 preferably include low drop out (LDO) voltage regulators. LDO voltage regulators typically have a number of characteristics that prove beneficial when used in the power feed assembly 778, such as a low drop out voltage, a wide bandwidth, a fast transient response, a relatively low output ripple, and they have a small footprint (i.e., reduced size) and are often relatively low in weight.

Due to their design, LDO voltage regulators often use relatively large capacitors at their input and output to minimize voltage droop during periods of high power output, such as required by the TR modules when transmitting a radio signal during a high-scan mode. However, in at least one embodiment, a smaller input capacitor 412 and output capacitor 414 are, used in the voltage regulator 410, and voltage droop is minimized by increasing (i.e., "ramping up") the magnitude of the output voltage from a PCU provided to the input capacitor 412 and/or the output voltage provided from the voltage regulator 410 to the capacitor 414 prior to and during a period of temporarily-increased power consumption. To provide an increased input to the voltage regulators 410 of the regulator assembly 790, one or more of the PCUs 750–770 increase their output voltage prior to the increase in power consumption, thereby increasing the voltage level of one or more of the busses 780–788 connected to the voltage regulators 410. For example, PCUs 758, 760 could be coupled in parallel to buss 784. Buss 784, in this case, provides 6 VDC during normal duty modes. However, prior to a high-duty scan cycle, the output voltages of the PCUs 758, 760 are increased to 9 VDC in preparation for the increase in power consumption. As a result, the voltage level of the buss 784 increases from 6 V to 9 V. The increased voltage on the buss 784 causes additional charge to be stored in the input capacitors 412 of the voltage regulators 410 connected to the buss 784, which provides additional energy to the corresponding TR modules during their increase in power consumption. Likewise, the increased voltage and the resulting additional charge stored on the input capacitor 412 of the voltage regulator 410 minimizes or prevents voltage droop during the period of increased power consumption.

Likewise, the regulated output voltage of the voltage regulator 410 can be ramped-up in a similar manner to provide additional charge on the output capacitor 414 prior to the temporary increase in power consumption by the corresponding TR module. Thus a ramp-up of both the input voltage to and the output voltage from the voltage regulator 410 results in additional charge stored in the capacitors 412, 414 of the voltage regulator 410, and this potential for building up a stored charge prior to an anticipated increase in power consumption, may allow smaller capacitors to be used as compared to conventional power distribution systems.

As noted previously, the TR modules of the TR module assembly 792 typically have variable load requirements. To minimize the power consumption of the TR module assembly 792 during periods of little activity, one or more of PCUs 750–770 can be deactivated until the power consumption is increased. For example, assume that the three PCUs 750–754 are connected in parallel to buss 780 and each PCU provides a maximum of 1 kW of power. When the TR module assembly 792 is only consuming 1 kW of power via buss 780, PCU 754, for example, can be deactivated, thereby reducing the overhead resulting from an otherwise idle PCU 754, while still providing a 1× redundancy via the two remaining PCUs 750, 752.

In at least one embodiment, the operations of PCUs 750–770 and/or PCUs 742–748 are controlled by the PCM 626. In this case, the PCM 626 can monitor the status of the radar assembly 520 and determine the current and/or future power requirements of the radar assembly 520. This power consumption data can be provided from the processor assembly 530 used to control the radar assembly 520. Alternatively, the power consumption data can be obtained from BIT data provided by one or more components of the radar assembly 520. Based on this power consumption information, the PCM 626 can direct the PCUs to activate, deactivate, ramp-up or ramp-down their output voltages, and the like. For example, the PCM 626 could determine the power consumption of the radar system 500 at any given time and activate the minimum number of PCUs needed to meet the power requirements at the time.

In the event that an increase in power consumption is detected, the PCM 626 can activate more PCUs, or if the power consumption decreases further, the PCM 626 can deactivate one or more of the previously active PCUs, as appropriate. Likewise, the PCM 626, with knowledge of an imminent temporary increase in power consumption, can direct one or more of the PCUs 750–770 to ramp-up their output voltages, thereby increasing the voltage magnitudes on one or more of busses 780–788. Further, some PCUs may be dedicated to certain busses while one or more other PCUs may be available for connection to multiple busses and in conjunction with multiple groupings by the dedicated/undedicated PCUs.

Any of a variety of mechanisms may be used to transmit data or signals between the PCM and the PCUs of the radar system 500. For example, digital data could be sent from the PCM 626 to the antenna pedestal 522 via the I/O signal panels 624, 702, and then to the power feed assembly 778 via the slip-ring 524. Alternatively, control data can be transmitted between the PCM 626 and the power feed assembly 778 via wireless transceivers. Other methods for transmitting control and BIT data between the PCUs 750–770 and the PCM 626 may be used without departing from the spirit and the scope of the present invention.

In at least one embodiment the PCUs of the radar assembly 520 are of the same make, thereby allowing for standardization and interchangeability. For example, if PCU 742 fails, it can be replaced with another PCU with minimal modification. Likewise, multiple PCUs may be connected to a component to provide redundancy. It will be appreciated that the various components of the radar assembly 520 having power supplied by a PCU may have different input voltage requirements. For example, the receiver/exciter 730 may require an input voltage of 24 V whereas the radar signal processor 728 may only require an input voltage of 6 V. Likewise, the PCU 750 may be connected to a 43 volt buss (buss 780), whereas the PCU 760 may be connected to a 6 volt buss (buss 784).

Accordingly, in at least one embodiment, the output voltage of a PCU is set according to the location or application of the PCU within the system 500. Any of a variety of mechanisms may be used to set the output voltage of the PCU based on its location within the radar system 500. One mechanism includes setting the voltage manually before connecting a PCU to a specific location. Another mechanism includes using a standard interface to connect a PCU in a certain location of the radar system 500. In this case, the standard interface can have a plurality of address pins to connect to a corresponding address pin interface on the PCU. The output voltage of the PCU can be based on the value represented on the plurality of address pins. For example, if the standard interface includes three voltage address pins, each having either a "high" voltage or a "low" voltage output, then the address pins together can represent 8 ($2^3$) different values. The PCU then can reference a table stored in a memory location to determine an output voltage corresponding to a certain value represented by the voltages on the address pins, and set its output voltage accordingly.

For example, in one embodiment, the PCUs are of a standard configuration. In this case, location of the radar system 500 that utilizes a PCU to provide power could have a standard interface to connect to the PCU. This interface could include some mechanism to indicate the expected output voltage to a PCU connected to the interface. These mechanisms can include a set of pins of the interface having various voltages based on location of the interface in the system. When the PCU is connected to the interface, the PCU could detect the voltage levels on the pins, determine a value based from pin voltages, and look up a corresponding output voltage in a table. After determining the output voltage from the table, the PCU can set its output voltage to this determined value. For example, when an interchangeable PCU is connected to the receiver/exciter 730, the interface to the receiver/exciter 730 could have three pins having a voltage sequence of low, high, low (or 101), corresponding to an expected output voltage of +6 VDC. Accordingly, the PCU can search a table for the output voltage corresponding to the value 101.

After finding the corresponding output voltage value (+6 VDC) in the table, the PCU can set its output to +6 VDC. Conversely, if the PCU is connected to the bus 780 via an interface associated with the bus 780, the three pins of the interface could have a voltage sequence of high, high, low (or 110), corresponding to an expected output voltage of +43 VDC. Using this pin voltage sequence, the PCU could determine the expected output voltage from the table and set its output voltage to +43 VDC accordingly. Yet another mechanism is to have the PCU send a signal via a data bus to the PCM 626 when it is first installed. Based on a characteristic of the signal sent by the PCU, such as a source address associated with the interface to which the PCU is connected, the PCM 626 can determine the desired output voltage for the PCU and send a signal representative of the voltage to the PCU over the data bus. Any mechanism for setting the output voltage of the PCU based on the location of the PCU may be implemented in accordance with the present invention.

Figure 8:
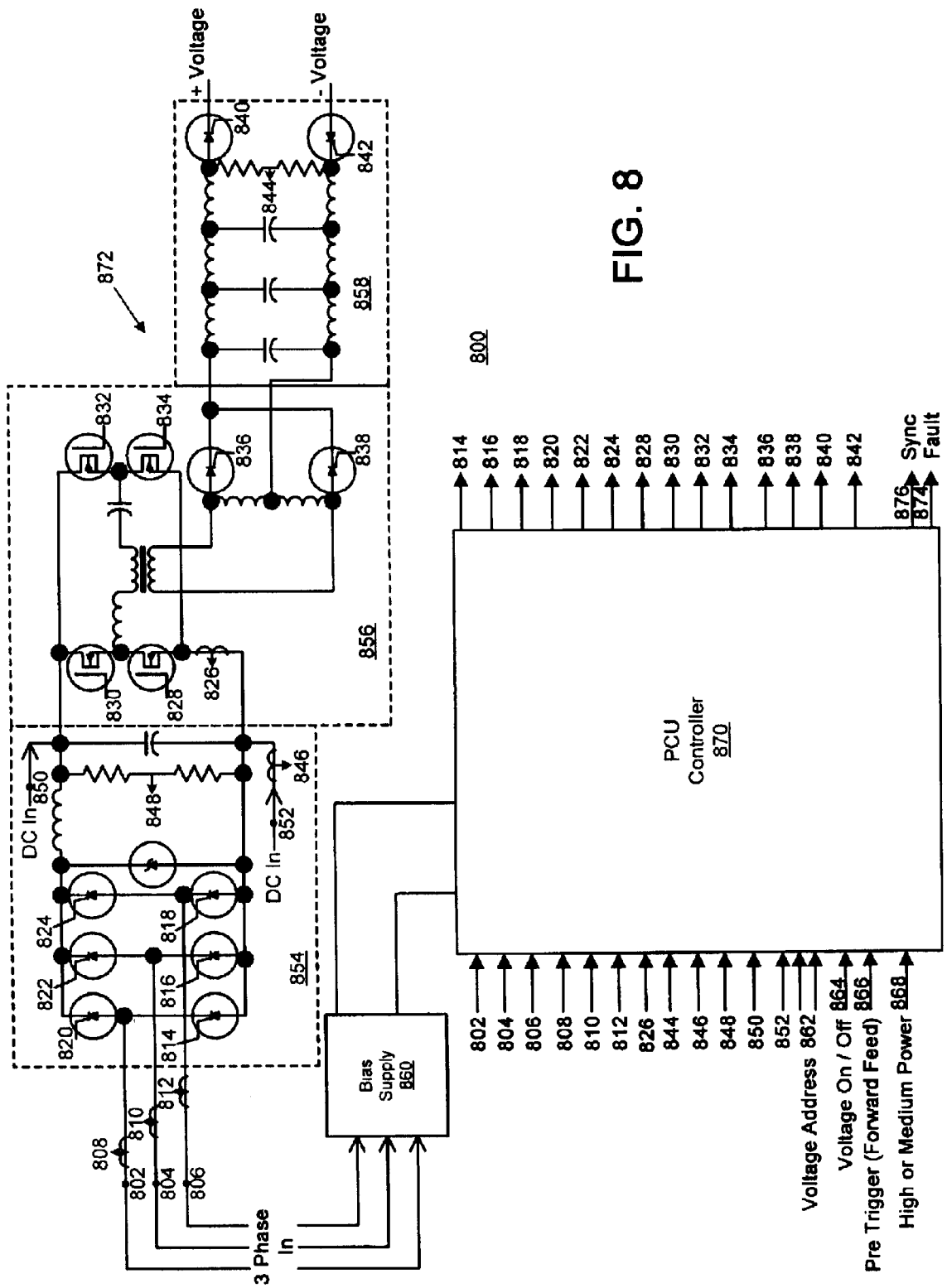
FIG. 8 is a circuit schematic illustrating an exemplary implementation of a power conversion unit in accordance with at least one embodiment of the present invention.

Referring now to FIG. 8, an exemplary implementation of a power conversion unit (PCU) 800 is illustrated in greater detail in accordance with at least one embodiment of the present invention. As described previously, in at least one embodiment, the PCU 800 is adapted to receive power having a first form, such as high-voltage AC power or DC power, convert the power into power having a second form, such as low-voltage DC power, and provide the power in the second form to a load, either directly or through an intermediary such as the voltage regulator 410. Additionally, in at least one embodiment, the PCU 800 is adapted to ramp-up its output voltage in anticipation of a temporary increase in power consumption by the load to which the PCU 800 is connected. The PCU 800 can also be adapted to be deactivated when not needed for the distribution of power to the load and activate from an inactive state in response to an increased load requirement.

In one implementation, the PCU 800 is adapted to fit onto a standard Versa Module Europa (VME) card, such as a 6U VME card, to provide standardization of the PCU. By standardizing the PCU 800, a single PCU can be utilized in any of a number of different systems as well as in any of a plurality of PCU positions within a power distribution system. Additionally, this standardization reduces the number of least recently used (LRU) types required for spare PCUs. Likewise, standardization typically reduces the life cycle cost of the PCU, typically provides for greater system efficiency and greater reliability, and provides for ease of maintenance.

The PCU 800, in one embodiment, includes a power conversion circuit 872 and a PCU controller 870 adapted to monitor and control the operation of the power conversion circuit 872. The power conversion circuit 872, in one embodiment, includes an AC-DC converter 854, a DC-DC converter 856, and an output filter 858. In the embodiment illustrated in FIG. 8, the AC-DC converter 854 includes a full-phase rectifier to receive three-phase AC voltage and convert the three-phase voltage to a DC voltage. The DC-DC converter 856, in one embodiment, includes an "H" bridge topology to step down the DC voltage. The converted DC power is then filtered by the output filter 858 and provided as an output voltage to a load or an intermediary to the load, such as the voltage regulator 410.

In addition to being adapted to receive power in the form of an AC voltage and convert the signal to a DC voltage, the power conversion circuit 872, in one embodiment, is further adapted to receive a higher-level DC voltage via DC inputs 850, 852. The power conversion circuit 872 then can step down the DC voltage at the DC-DC converter 856 to a lower-level DC voltage, filter the DC voltage signal using the output filter 858, and provide the lower-level DC voltage at the output of the power control circuit 872. In this case, the PCU 800 can be adapted to provide a universal front end that allows the PCU 800 to convert power having a variety of forms, such as an AC form or a DC form, and thereby allows the PCU 800 to accept power from a variety of power sources. Although the PCU 800 is not limited to any AC voltage range, the PCU 800, in one embodiment, is adapted to receive and convert power having an AC voltage in the range of preferably about 0–1000 VAC, more preferably about 200–500 VAC, and most preferably about 220–440 VAC. Similarly, although the PCU 800 can be adapted to accept power having any of a variety of line frequencies, in at least one embodiment, the PCU 800 is adapted to manage input AC power having a line frequency ranging from about 50 Hz to about 60 Hz into power. Likewise, the PCU 800 can be adapted to receive and convert power having a form of a first DC voltage to power having a form of a second DC voltage. For example, in one embodiment, the PCU can convert power having a DC voltage magnitude in the range of preferably 0 to 1000 VDC, more preferably about 200 to about 500 VDC, and most preferably about 250–450 VDC to power having a DC voltage magnitude in the range of preferably about 0 to 1000 VDC, more preferably about 0 to 100 VDC, and most preferably about 0 to 50 VDC. In one embodiment, the PCU 800 is adapted to comply with the U.S. Navy DC Zonal Electrical Distribution (ZED) prediction for the year 2004.

The PCU controller 870 can include any of a variety of controllers and/or processors, such as one or more of a microcontroller, a microprocessor, a programmable logic device, an application specific integrated circuit (ASIC), discrete circuit components, and the like, or a combination thereof. In one embodiment, the PCU controller 870 monitors and/or controls the operation of the power conversion circuit 872 to control the conversion operation of the PCU 800 such that power is more efficiently distributed to the load to which the PCU 800 is connected. Accordingly, the PCU controller 870 can include a plurality of inputs from the power conversion circuit 872 to monitor the operation of the power conversion circuit 872 and include a plurality of outputs to the power conversion circuit 872 to control the operation of the power conversion circuit 872. An exemplary implementation of these inputs and outputs by the PCU controller 870 is as follows:

AC-DC Conversion and Power Factor Correction: In one embodiment, the PCU controller 870 is adapted to monitor the input voltages of each line of the three-phase AC power input to the power conversion circuit 872 via inputs 802–806. Likewise, the three input currents can be monitored via inputs 808–812. Based on the monitored voltages/currents, the PCU controller 870 can control the gates of the full-phase rectifier via outputs 814–824. The PCU controller 870 can be adapted to control the gates to insure balanced loading of the input power. Likewise, the PCU controller 870 can be adapted to control the gates such that the phase angle between the input voltage and the input current is less than a desired angle, such as 1 degree. As a result, the PCU controller 870 can be adapted to insure a certain power factor (PF), such as a PF greater than 0.9 with a phase angle less than 1 degree. Software code, algorithms, and the like may be modeled in light of known physical and electrical relationships and properties to achieve the desired functionality and operation.

DC-DC Conversion: In one embodiment, the PCU controller 870 is adapted to monitor the high voltage rail of the AC-DC converter 854 via input 848. Using this monitored voltage, the PCU controller 870 can be adapted to control the operation of the H-bridge of the DC-DC converter 856 via the outputs 828–834 to the gates of the H-bridge, turning the gates on and off as appropriate. Similarly, the PCU controller 870 can be adapted to provide synchronous rectification by providing signals to the gates connected to the outputs 836, 838. Although an H-bridge topology is illustrated for the DC-DC converter 856, other conversion topologies may be used without departing from the spirit or the scope of the present invention.

Connection to/Disconnection from an Output Buss: In one embodiment, the PCU controller 870 is adapted to connect and disconnect the power conversion circuit from an output buss by controlling the output gates via outputs 840, 842. When the PCU 800 is operational and providing power to a load, the PCU controller 870 can activate the output gates of the output filter 858 via the outputs 840, 842, providing a connection between the buss and the power conversion circuit 872. However, when the PCU 800 is not utilized to provide power, the power conversion circuit 872 can be disconnected to eliminate current draw from the output buss by the power conversion circuit 872.

Voltage On/Off: As discussed previously, a PCM can deactivate one or more PCUs to reduce the power consumption of unnecessary or idle PCUs. Accordingly, in one embodiment, the PCM sends a signal to the PCU controller 870 via the input 864. For example, the PCM could place an active high signal on the input 864 to indicate that the PCU is to be turned on and maintain the active high signal until the PCU is to be turned off. Alternatively, a signal pulse on the input 864 could cause the PCU to switch states between on and off, and vice versa. When the PCU 800 is turned off, the PCU controller 870 can close the output gates via the outputs 840, 842 to disconnect the PCU 800 from an output buss. Likewise, the PCU controller 870 can close one or more of the input gates of the full-phase rectifier via the outputs 814–824, thereby disconnecting the PCU 800 from the input power supply. Still further, a pulse width modulation scheme could be implemented for more versatile control of the output voltage.

Synchronization: In order to ensure current sharing between multiple PCUs connected in parallel, the PCU 800 can receive a sharing signal via sync input 876. Using this sharing signal, the PCU 800 can adapt its settings to either increase or decrease its current output, as appropriate.

Set Output Voltage: As discussed previously, the output voltage of the PCU 800 can be controlled based on the location or application of the PCU 800 within the power distribution system. In this case, the PCU controller 870 can receive an indicator of the desired output voltage via voltage address input 862. To illustrate, the interface used to connect a PCU to a system, such the interface used to connect the PCU 744 to the radar signal processor 728 of FIG. 7, can include three pins to connect to the PCU 744. The three pins can each have a high voltage level or a low voltage level, resulting in eight ($2^3$) possible combinations in binary. Each of these eight possible pin voltage combinations could correspond to a voltage level, resulting in eight possible voltage levels represented by the three pins. The PCU controller 870 of the PCU 744 can determine which pins have which voltages to determine the output voltage the PCU 744 is to provide to the radar signal processor 728. Accordingly, the voltages on the pins can be used in a manner similar to accessing a specific address in a random access memory. In fact, in one embodiment, the PCU 800 includes a table of output voltage values stored in memory, such as a flash electrically erasable programmable memory (EEPROM). Accordingly, when a value is transmitted to the PCU controller 870 via the voltage address input 862, the PCU controller 870 can look-up the corresponding output voltage value in the table, and control the power conversion circuit 872 to generate the output voltage value at the output of the power conversion circuit 872.

Voltage Ramp-Up: As discussed previously, in at least one embodiment, the PCU 800 is adapted to ramp-up its output voltage prior to a temporary increase in power consumption. Accordingly, a PCM can signal the PCU 800 to ramp-up the output voltage using the pre-trigger input 866 of the PCU controller 870. In one embodiment, the PCU controller 870 ramps the output voltage of the power conversion circuit 872 to a preset voltage when the signal is received on the pre-trigger input 866. Alternatively, the PCM can indicate the desired ramped-up voltage of the power conversion circuit 872 by providing an indicator of the desired voltage via the pre-trigger input 866.

Control/BIT: In at least one embodiment, the PCU controller 870 can monitor one or more voltages and/or currents of the power conversion circuit 872 to prevent damage to the PCU 800 or to the system connected to the PCU 800. The PCU controller 870 can monitor the input voltages via inputs 802–806 and/or the input currents via inputs 808–812. In the event that the input voltages or currents fall out of the operating range of the power conversion circuit 872, the PCU controller 870 can shut down the PCU 800 and signal the PCM of the error, such as via a fault output 874. Likewise, by monitoring the output voltage using input 844, the PCU controller 870 can provide over voltage protection (OVP) by shutting down the PCU 800 when the output voltage exceeds the desired output voltage by a certain amount, such as when the output voltage exceeds 120% of the desired or optimal output voltage. The PCU controller 870 then can reprise the PCM of its over voltage status via the fault output 874. Likewise, the PCU controller 870 can monitor the output current to provide over current protection (OCP) when the output current exceeds the desired output current by a certain amount, such as by monitoring the current of the H-bridge using current input 826.

In addition to providing OVP and OCP, in one embodiment, the PCU controller 870 can provide over temperature protection (OTP) by shutting down the PCU 800 when the PCU controller 870 detects a temperature of the PCU 800 that exceeds a maximum operating temperature based on an input from a temperature sensing device (not shown) representing the temperature of the PCU 872. This fault can then be provided to a PCM via the fault output 874.

Furthermore, the PCU controller 870 can be adapted to protect against short circuits by implementing a "Hiccup" Mode, whereby the PCU controller 870 shuts down the power conversion circuit 872 when a short circuit is detected that persists for more than a certain time period (5 seconds, for example). The PCU controller 870 keeps the power conversion circuit 872 off for a certain amount of time, and then powers up the power conversion circuit 872 and monitors for the short. If the short is still present, the shutdown/startup cycle is repeated. If the short persists after the shutdown/startup cycle has been repeated a certain number of times, the PCU controller 870 shuts down indefinitely the power conversion circuit 872 and notifies the PCM of the shutdown status using the fault output 874.

To assist in diagnosing any errors present in a power distribution system implementing a PCU, the PCU controller 870, in one embodiment, includes a BIT register (not shown) having a plurality of BIT entries. Each time a fault is detected by the PCU controller 870, the fault is stored in the BIT register. Accordingly, a technician can access the BIT register of the PCU controller 870 to determine which faults have occurred, and use this data to evaluate the source of a problem with the operation of the PCU and/or the system to which the PCU is connected. The BIT register can be accessed by a PCM, by a maintenance personal computer (MPC), and the like.

The PCU 800, in addition to improving the efficiency of the distribution of power, can include additional design features that improve the efficiency of the PCU 800 itself and/or provide protection to the power distribution system. For example, in one embodiment, the planar magnetics of the PCU 800 are constructed such that the H-bridge of the DC-DC converter 856 and the output inductors of the output filter 858 are on the same magnetic core, thereby reducing magnetic losses. Likewise, switching losses in the H-bridge and the output rectifiers of the DC-DC converter 856 can be reduced by implementing Zero Voltage/Zero Current Switching. Likewise, in one embodiment, the AC-DC converter 854 and the DC-DC converter 856 are co-located, thereby reducing losses between the two converters and reducing the need for relatively large capacitor banks between the two converters. Additionally, in one embodiment, some or all of the components of the PCU 800 are constructed using silicon carbide (SiC) components, which typically have a lower "on" resistance and higher current capabilities. Likewise, in at least one embodiment, the PCU 800 is adapted to utilize Power Factor Correction (PFC), thereby reducing the cost, size, and weight of one or more components of the PCU 800 as well as reducing the rectifier reverse voltage requirement and allowing smaller inductors to be utilized. As a result of these improvements, as well as others, the PCU 800, in one embodiment, only requires air-cooling, further reducing, the size, cost, and power consumption of the PCU 800.

Other embodiments, uses, and advantages of the invention will be apparent to those skilled in the art from consideration of the specification and practice of the invention disclosed herein. The figures and the specification should be considered exemplary only, and the scope of the invention is accordingly intended to be limited only by the following claims and equivalents thereof.

What is claimed is:

1. A power conversion unit for converting power for use by a variable load, the power conversion unit comprising:
   a power conversion circuit including:
      an AC-DC converter having an input and an output and being adapted to convert an AC voltage to an intermediary DC voltage; and a DC-DC converter having an input electrically coupled to the output of the AC-DC converter and an output electrically coupled to the variable load, the DC-DC converter being adapted to convert the intermediary DC voltage to an output DC voltage; and a controller in electrical communication with the power conversion circuit, the controller being adapted to change the output DC voltage from a first voltage to a second voltage based at least in part on information related to the variable load.

2. The power conversion unit of claim 1, wherein the information related to the variable load represents a predicted change in a load requirement of the variable load.

3. The power conversion unit of claim 2, wherein the predicted change is based at least in part on one or more of: a historical analysis of the load requirement of the variable load; a sensed condition relating to the variable load; and a set of instructions related to an operation of the variable load.

4. The power conversion unit of claim 2, wherein:
a magnitude of the second voltage is greater than a magnitude of the first voltage when the predicted change in the load requirement includes a predicted increase in the load requirement; and
a magnitude of the second voltage is less than a magnitude of the first voltage when the predicted change in the load requirement includes a predicted decrease in the load requirement.

5. The power conversion unit of claim 1, wherein the controller is adapted to do one or both of activate and deactivate the power conversion circuit based at least in part on an activation signal received by the controller.

6. The power conversion unit of claim 1, wherein the power conversion circuit further comprises an output filter having an input electrically coupled to the output of the DC-DC converter and an output electrically coupled to the variable load, the output filter being adapted to condition the output DC voltage prior to output to the variable load.

7. The power conversion unit of claim 1, wherein the DC-DC converter further includes an input to receive power having an input DC voltage, the DC-DC converter further being adapted to convert the input DC voltage to the output DC voltage.

8. The power conversion unit of claim 7, wherein a magnitude of the input DC voltage is within the range of about 0 volts to about 1000 volts.

9. The power conversion unit of claim 7, wherein a magnitude of the input DC voltage is within the range of about 0 volts to about 500 volts.

10. The power conversion unit of claim 7, wherein a magnitude of the input DC voltage is within the range of about 220 volts to about 450 volts.

11. The power conversion unit of claim 1, wherein the controller further includes storage being adapted to store test data resulting from an operation of the power conversion circuit.

12. The power conversion unit of claim 1, wherein the AC voltage includes 3-phase AC voltage and the controller further includes a plurality of three phase voltage inputs and a plurality of three phase current inputs electrically coupled to the input of the AC-DC converter, and where the controller is adapted to monitor the input three-phase AC voltage using the plurality of input voltage inputs and to monitor input AC currents using the plurality of input current inputs.

13. The power conversion unit of claim 12, wherein the controller is further adapted to control the AC-DC converter to provide power factor correction based at least in part on the monitored AC voltages and the AC currents.

14. The power conversion unit of claim 1, wherein the controller further is adapted to receive voltage address information representing a desired voltage for the output DC voltage.

15. The power conversion unit of claim 14, wherein the desired voltage is based at least in part on a location of the power conversion unit in a power management system.

16. The power conversion unit of claim 14, wherein the controller is further adapted to provide the output DC voltage having the desired voltage to the variable load.

17. The power conversion unit of claim 14, wherein the controller includes an interface adapted to receive a sequence of voltages from a plurality of pins, the sequence of voltages representing the desired voltage.

18. The power conversion unit of claim 1, wherein the controller includes is a microcontroller, a microprocessor, a field programmable gate array, a programmable logic device, an application specific integrated circuit, or discrete logic.

19. The power conversion unit of claim 1, wherein the AC-DC converter includes a rectifier.

20. The power conversion unit of claim 19, wherein the rectifier includes a three phase full wave rectifier.

21. The power conversion unit of claim 1, wherein the DC-DC converter includes an H-bridge topology.

22. The power conversion unit of claim 1, wherein a magnitude of the output DC voltage is within the range of about 0 volts to about 1000 volts.

23. The power conversion unit of claim 1, wherein a magnitude of the output DC voltage is within the range of about 0 volts to about 100 volts.

24. The power conversion unit of claim 1, wherein a magnitude of the output DC voltage is within the range of about 0 volts to about 50 volts.

25. The power conversion unit of claim 1, wherein the power conversion unit is adapted for use in a radar system.

26. In a power management system, an apparatus for converting power having a first form to power having a second form and for providing the power having the second form to at least one variable load, the apparatus comprising:
a power conversion circuit adapted to convert power having the first form to power having the second form; and
means for controlling an output voltage of the power conversion circuit based at least in part on a predicted change in a load requirement of the at least one variable load.

27. The apparatus of claim 26, wherein the means for controlling the output voltage includes:
means for increasing a magnitude of the output voltage when the predicted change in the load requirement includes a predicted increase in the load requirement; and
means for decreasing a magnitude of the output voltage when the predicted change in the load requirement includes a predicted decrease in the load requirement.

28. The apparatus of claim 26, further including means for predicting the predicted change in the load requirement.

29. The apparatus of claim 28, wherein the predicting means is adapted to predict the predicted change based at least in part on one or more of: a historical analysis of the load requirement of the variable load; a sensed condition related to the variable load; and a set of instructions related to an operation of the variable load.

30. The apparatus of claim 26, further comprising:
means for activating the power conversion circuit when the load requirement increases above a first level; and
means for deactivating the power conversion circuit when the load requirement decreases below a second level less than the first level.

31. The apparatus of claim 26, wherein the power conversion circuit is further adapted to convert power having the second form and a first voltage to power having the second form and a second voltage different from the first voltage.

32. The apparatus of claim 26, further including means for providing over voltage protection for the power conversion circuit.

33. The apparatus of claim 26, further comprising means to provide over temperature protection for the power conversion circuit.

34. The apparatus of claim 26, further comprising:
means for generating information associated with an operation of the power conversion circuit; and
means for storing at least a portion of the test information for subsequent access.

35. The apparatus of claim 26, wherein the power having the first form includes three phase AC power and the power having the second form includes DC power having an output DC voltage.

36. The apparatus of claim 35, wherein the power conversion circuit comprises:
an AC-DC converter adapted to convert the three phase AC power to power having an intermediary DC voltage; and
a DC-DC converter electrically coupled to the AC-DC converter and being adapted to convert the power having the intermediary DC voltage to power having the output DC voltage.

37. The apparatus of claim 36, wherein the power conversion circuit further comprises an output filter electrically coupled to the DC-DC converter and being adapted to condition the power having the output DC voltage.

38. The apparatus of claim 26, wherein the power having the first form includes DC power having an input DC voltage and the power having the second form includes DC power having an output DC voltage different from the input DC voltage.

39. The apparatus of claim 38, wherein the power conversion circuit includes a DC-DC converter adapted to convert the power having the input DC voltage to power having the output DC voltage.

40. The apparatus of claim 26, further comprising means for implementing power factor correction.

41. A method for providing power to a variable load using at least one power conversion unit, the method comprising the steps of:
providing power having a first voltage from the at least one power conversion unit to the variable load at a first time, wherein the first voltage is based on a load requirement of the variable load;
determining a second voltage based at least in part on a predicted change in the load requirement of the variable load occurring at a second time subsequent to the first time; and
temporarily providing power having the second voltage to the variable load at a third time at least prior to the second time and subsequent to the first time.

42. The method of claim 41, further comprising the step of predicting the predicted change in the load requirement.

43. The method of claim 42, wherein the predicted change is predicted based at least in part on one or more of: a historical analysis of the load requirement of the variable load; a sensed condition related to the variable load; and a set of instructions related to an operation of the variable load.

44. The method of claim 41, wherein:
the second voltage is greater than the first voltage when the predicted change in the load requirement includes a predicted increase in the load requirement; and
the second voltage is less than the first voltage when the predicted change in the load requirement includes a predicted decrease in the load requirement.

45. The method of claim 41, further comprising the steps of:
converting, at the at least one power conversion unit, power having a first form to power having a second form; and
providing the power having the second form from the at least one power conversion unit to the variable load.

* * * * *

UNITED STATES PATENT AND TRADEMARK OFFICE
CERTIFICATE OF CORRECTION

PATENT NO. : 6,801,027 B2
APPLICATION NO. : 10/254800
DATED : October 5, 2004
INVENTOR(S) : Raymond E. Hann et al.

It is certified that error appears in the above-identified patent and that said Letters Patent is hereby corrected as shown below:

Column 21, line 60: replace "are, used" with --are used--.

Signed and Sealed this

Seventh Day of November, 2006

JON W. DUDAS
*Director of the United States Patent and Trademark Office*